ns010206552B2

(12) United States Patent
Seong et al.

(10) Patent No.: US 10,206,552 B2
(45) Date of Patent: Feb. 19, 2019

(54) DISHWASHER AND METHOD FOR CONTROLLING THE SAME

(71) Applicant: SAMSUNG ELECTRONICS CO., LTD., Suwon-si, Gyeonggi-do (KR)

(72) Inventors: Su Jin Seong, Suwon-si (KR); Bo Kyung Lee, Seoul (KR); Jong Ho Lee, Yongin-si (KR); Ae Lee Im, Hwaseong-si (KR); Jung Soo Lim, Hwaseong-si (KR); Jung Min Choi, Hwaseong-si (KR); Jea Won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1268 days.

(21) Appl. No.: 13/718,266

(22) Filed: Dec. 18, 2012

(65) Prior Publication Data

US 2013/0152969 A1 Jun. 20, 2013

(30) Foreign Application Priority Data

Dec. 20, 2011 (JP) .......................... 10-2011-0138626
Nov. 20, 2012 (JP) .......................... 10-2012-0131380

(51) Int. Cl.
*A47L 15/42* (2006.01)
*A47L 15/00* (2006.01)

(52) U.S. Cl.
CPC ........... *A47L 15/42* (2013.01); *A47L 15/0057* (2013.01); *A47L 15/4238* (2013.01);
(Continued)

(58) Field of Classification Search
CPC ............. A47L 15/4208; A47L 15/4225; A47L 15/4219; A47L 15/4206; A47L 2501/05
(Continued)

(56) References Cited

U.S. PATENT DOCUMENTS

| | | |
|---|---|---|
| 5,947,135 A | 9/1999 | Sumida et al. |
| 2002/0096192 A1* | 7/2002 | Reichold ............. A47L 15/0057 |
| | | 134/104.1 |

(Continued)

FOREIGN PATENT DOCUMENTS

| | | |
|---|---|---|
| CN | 101267760 | 9/2008 |
| EP | 0 083 739 | 12/1982 |

(Continued)

OTHER PUBLICATIONS

Chinese Office Action dated Jun. 22, 2016 from Chinese Patent Application No. 201210559931.6, 9 pages.

(Continued)

*Primary Examiner* — David G Cormier
*Assistant Examiner* — Thomas Bucci
(74) *Attorney, Agent, or Firm* — Staas & Halsey LLP

(57) ABSTRACT

A dishwasher, in which a reservoir provided with an electrolyzer is connected to a water collector via a flow path change valve, and wash water in the reservoir is electrolyzed by the electrolyzer during non-operation of the wash water, to generate sterilizing water and to circulate the sterilizing water into the dishwasher, thereby achieving an enhancement in sterilizability of the dishwasher. A method for controlling a dishwasher makes it possible to suppress propagation of microorganisms left in the dishwasher and to remove organic substances, using a sterilizing agent or high-temperature water. It is also possible to reduce generation of offensive odor caused by decomposition of bacteria, through a reduction in the amount of bacteria in the dishwasher. Since sterilization of the dishwasher is automatically carried out, enhanced user convenience is provided.

27 Claims, 21 Drawing Sheets

(52) U.S. Cl.
CPC ....... *A47L 15/4291* (2013.01); *A47L 15/4217* (2013.01); *A47L 2301/04* (2013.01); *A47L 2401/04* (2013.01); *A47L 2401/09* (2013.01); *A47L 2401/10* (2013.01); *A47L 2401/11* (2013.01); *A47L 2401/12* (2013.01); *A47L 2401/20* (2013.01); *A47L 2401/30* (2013.01); *A47L 2501/01* (2013.01); *A47L 2501/03* (2013.01); *A47L 2501/05* (2013.01); *A47L 2501/06* (2013.01); *A47L 2501/07* (2013.01); *A47L 2501/16* (2013.01); *A47L 2501/26* (2013.01); *A47L 2501/30* (2013.01); *Y02B 40/46* (2013.01)

(58) Field of Classification Search
USPC .......... 134/104.1, 111, 18, 25.2, 56 D, 57 D, 134/58 D, 10, 104.4, 113, 115 R, 186, 134/95.3, 108
See application file for complete search history.

(56) References Cited

U.S. PATENT DOCUMENTS

| | | |
|---|---|---|
| 2003/0213505 A1 | 11/2003 | Price et al. |
| 2009/0078289 A1* | 3/2009 | Son .................... A47L 15/0036 134/18 |
| 2012/0060875 A1* | 3/2012 | Fauth .................... A47L 15/46 134/56 D |

FOREIGN PATENT DOCUMENTS

| | | | |
|---|---|---|---|
| JP | 2004-154491 | 6/2004 | |
| JP | 2005-245643 | 9/2005 | |
| JP | 2008-43392 | 2/2008 | |
| KR | 10-2006-0132204 | 12/2006 | |
| KR | 10-2009-0030989 | 3/2009 | |
| KR | 10-2010-0067828 | 6/2010 | |
| WO | WO-2010136294 A2 * | 12/2010 | ............. A47L 15/46 |

OTHER PUBLICATIONS

European Search Report dated Apr. 8, 2013 in corresponding European Application No. 12198261.5-1802.
Chinese Decision on Grant dated Mar. 20, 2017 from Chinese Patent Application No. 201210559931.6, 5 pages.
European Decision on Grant dated Mar. 7, 2017 from European Patent Application No. 12198261.5, 76 pages.
Korean Patent Office Action issued (Grounds for Rejection Office Action) in Korean Patent Application No. 10-2012-0131380 dated Oct. 16, 2018 (19 total pages).

* cited by examiner

DISHWASHER AND METHOD FOR CONTROLLING THE SAME

CROSS-REFERENCE TO RELATED APPLICATIONS

This application claims the benefit of Korean Patent Application Nos. 10-2011-138626 and 10-2012-131380 filed on Dec. 20, 2011 and Nov. 20, 2012, respectively, in the Korean Intellectual Property Office, the disclosures of which are incorporated herein by reference.

BACKGROUND

1. Field

Embodiments of the present disclosure relate to a dishwasher and a method for controlling the same, which are capable of keeping the interior of the dishwasher clean.

2. Description of the Related Art

Generally, a dishwasher is an appliance for removing contaminants (remnants of food) attached to dishes through injection of cold or hot wash water under high pressure.

Such a dishwasher includes a wash tub, in which washing of dishes is carried out, a plurality of baskets disposed in multiple stories to receive dishes, injection nozzles disposed at upper and lower portions of the wash tub, to inject wash water, and a pump connected to the injection nozzles, to pump wash water to the injection nozzles.

In such a dishwasher, wash water is supplied to the interior of the wash tub when dishes to be washed are loaded in the baskets. In accordance with operation of the pump, the wash water, which is collected in a water collector, is fed to the injection nozzles, and is then injected onto the dishes under high pressure. Thus, the dishes are washed by the injection pressure of the wash water.

That is, the dishwasher executes a wash operation and a rinsing operation by supplying an appropriate amount of water to the interior of the dishwasher and injecting the supplied water onto dishes through injection nozzles while circulating the water from the bottom side to the top side, and subsequently executes a drying operation to dry the washed dishes.

In such a dishwasher, however, bacteria may propagate in garbage and remnant water left in a filter, a water collector and flow passages within the water tub, and offensive odors may be emitted after completion of a series of wash processes including the wash operation, rinsing operation and drying operation, due to a sealed structure and humid environment of the dishwasher. Such bacteria propagation and offensive odor emission may cause user discomfort.

For a short period of time in which the dishwasher is used, the amount of bacteria in the dishwasher is temporarily reduced by high-temperature rinsing water and through the drying operation. However, bacteria multiply in the dishwasher for a long period time in which the dishwasher is not used, thereby causing internal contamination of the dishwasher. In particular, the amount of bacteria in the dishwasher is rapidly increased under the condition that the dishwasher is left for a prolonged period of time without sterilization of the interior thereof.

In a recently-developed dishwasher, an electrolyzer to execute sterilization is installed at the side of a water collector. In this dishwasher, sterilization is executed by electrolyzing wash water, using the electrolyzer, when the water level of the water collector is equal to or higher than a predetermined water level.

In this case, however, it may be impossible to sterilize the whole interior of the dishwasher when the water level of the water collector exceeds the predetermined water level. In this case, only the interior of the water collector may be sterilized.

SUMMARY

Therefore, it is an aspect of the present disclosure to provide a dishwasher and a method for controlling the same, which are capable of achieving periodic execution of an operation of sterilizing the dishwasher by producing sterilizing water and circulating the produced sterilizing water in the interior of the dishwasher during non-operation of the dishwasher.

It is another aspect of the present disclosure to provide a dishwasher and a method for controlling the same, which are capable of increasing solubility of a detergent and using wash water as reserve wash water by electrolyzing wash water when no operation is executed during operation of the dishwasher.

It is another aspect of the present disclosure to provide a dishwasher in which a heater or a sterilizing agent storage unit is used as a sterilizer, and a method for controlling the same.

Additional aspects of the disclosure will be set forth in part in the description which follows and, in part, will be apparent from the description, or may be learned by practice of the disclosure.

In accordance with one aspect of the present disclosure, a dishwasher includes a water collector to collect wash water from a wash chamber, a reservoir to store a portion of the wash water, an electrolyzer disposed in the reservoir, a flow path change valve to open and close a flow passage between the water collector and the reservoir, a circulation pump to circulate the water stored in the water collector and the reservoir into the wash chamber, and a controller to control the electrolyzer to electrolyze the wash water in the reservoir during non-operation of the dishwasher, for production of sterilizing water, and to control the flow path change valve and the circulation pump to circulate the produced sterilizing water through an interior of the dishwasher.

In accordance with another aspect of the present disclosure, a method for controlling a dishwasher including a water collector to collect wash water from a wash chamber, a reservoir to store a portion of the wash water, an electrolyzer disposed in the reservoir, a flow path change valve to open and close a flow passage between the water collector and the reservoir and a circulation pump to circulate the water stored in the water collector and the reservoir into the wash chamber includes electrolyzing the wash water in the reservoir during non-operation of the dishwasher, thereby producing sterilizing water, and circulating the produced sterilizing water through an interior of the dishwasher, thereby sterilizing the interior of the dishwasher.

In accordance with another aspect of the present disclosure, a dishwasher includes a wash tub, a wash assembly, in which water flows to wash dishes received in the wash tub, a sterilizer to produce sterilizing water, and a controller to control driving of the sterilizer in a sterilization mode, for production of sterilizing water, and to control driving of the wash assembly in the sterilization mode, to cause the sterilizing water to circulate through an interior of the wash tub and an interior of the wash assembly.

In accordance with another aspect of the present disclosure, a method for controlling a dishwasher including a wash tub and a wash assembly to circulate water received in the wash tub for washing of dishes includes determining whether a sterilization mode to wash and sterilize the wash tub and the wash assembly has been received, and detecting whether there are dishes received in the wash tub, when it is determined that the sterilization mode information has been received, controlling a water supplier, to supply water, when it is determined that there are no dishes in the wash tub, heating the supplied water, thereby producing sterilizing water, controlling the wash assembly to circulate and inject the produced sterilizing water into the wash tub and the wash assembly, and controlling a drainage unit to outwardly drain the sterilizing water after completion of the circulation and the injection.

In accordance with another aspect of the present disclosure, a method for controlling a dishwasher including a wash tub and a wash assembly to circulate water received in the wash tub for washing of dishes includes determining whether a sterilization mode to wash and sterilize the wash tub and the wash assembly has been received, and detecting whether there are dishes received in the wash tub, when it is determined that the sterilization mode information has been received, controlling a water supplier, to supply water, when it is determined that there are no dishes in the wash tub, discharging a sterilizing agent into the supplied water, thereby producing sterilizing water, controlling the wash assembly to circulate and inject the produced sterilizing water into the wash tub and the wash assembly, and controlling a drainage unit to outwardly drain the sterilizing water after completion of the circulation and the injection.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
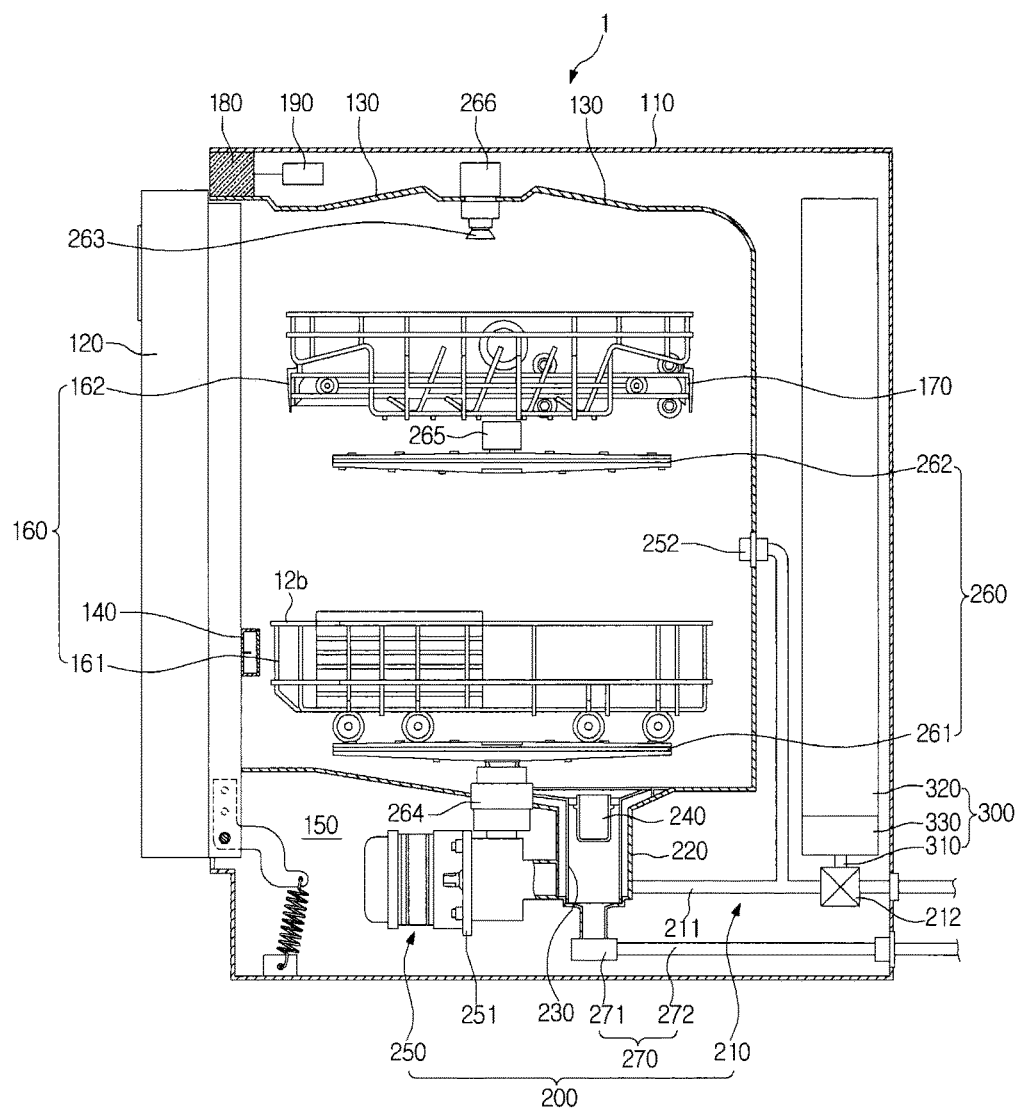
FIG. 1 is a sectional view illustrating a dishwasher according to an exemplary embodiment of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

Hereinafter, embodiments of the present disclosure will be described with reference to the accompanying drawings.

FIG. 1 is a sectional view illustrating a dishwasher according to an exemplary embodiment of the present disclosure.

As shown in FIG. 1, the dishwasher, which is designated by reference numeral "1", includes a body 110, a door 120, a wash tub 130, a detergent storage unit 140, a machinery chamber 150, a receiver 160, a guide 170, a user interface 180, a drive module 190, a wash assembly 200, and a sterilizer 300.

The body 110 of the dishwasher 1 forms an outer appearance of the dishwasher 1, as shown in FIG. 1. The body 110 has an opening at one side thereof. A door 120 is provided at the opening of the body 110 such that it is pivotable to open or close the opening. The wash tub 130 is defined by an inner wall of the body 110, and is opened or closed by the door 120. The detergent storage unit 140 is installed at the door 120 such that it can be opened or closed. The detergent box 140 stores a detergent to remove contaminants attached to dishes. The machinery chamber 150 is formed in the body 110 while being spatially separated from a wash chamber formed in the body 110 by the wash tub 130. A part of the wash assembly is disposed in the machinery chamber 150.

The receiver 160, which is also included in the dishwasher 1, receives dishes.

The receiver 160 includes a plurality of baskets installed in the wash tub 130 while being spaced apart from one another, to divide the wash chamber into a plurality of receiving spaces. The baskets are slidable forward and backward. Using the baskets, it may be possible to easily load and unload dishes.

In the illustrated case, the receiver 160 includes baskets 161 and 162 respectively installed at upper and lower portions of the wash chamber, to receive dishes or the like.

The guide 170 guides the baskets to the inside or outside of the wash chamber. The user interface 180 is provided at the body 110, for manipulation and display of information as to operation of the dishwasher 1. The drive module 190 controls operation of the dishwasher 1 and drives various loads. The wash assembly 200 is disposed in the machinery chamber 150 and wash tub 130, to execute washing, rinsing, and drying operations for dishes.

The wash assembly 200 includes a water supplier 210, a water collector 220, a heater 230, a filter 240, a circulator 250, an injector 260, and a drainer 270.

The water supplier 210 is arranged between an external water supply source and the water collector 220. The water supplier 210 includes a water supply tube 211 to guide water supplied from the external water supply source to the water collector 220, and a water supply valve 212 to allow or prevent supply of water from the external water supply source to the water collector 220.

The water collector 220 has a structure recessed to a predetermined depth to allow wash water and contaminants to be collected at a bottom of the wash chamber. The water collector 220 collects water supplied through the water supply tube 211 or wash water used in a wash operation. The water collector 220 also collects a detergent discharged from the detergent storage unit 140.

That is, in a wash mode, the water collected in the water collector 220 becomes wash water in accordance with dissolution of the detergent therein. The wash water circulates through the wash tub 130, water collector 220, circulator 250, and injector 260.

In more detail, the water collector 220 is connected to the circulator 250, to supply water to the circulator 250 during the wash operation. The water collector 220 also receives water injected into the wash tub 130 through the injector 260, and subsequently supplies the received water to the circulator 250 after storing the water.

An insulator (not shown) or the like is provided around the water collector 220, to prevent heat dissipation of water in the water collector 220 and thus to maintain the temperature of the water.

The heater 230 is disposed around the water collector 220. The heater 230 is driven in accordance with a command from a controller 191a, to heat water in the water collector 220.

The filter 240 is installed in the water collector 220, to filter out contaminants.

That is, the filter 240 separates wash water from a mixture of the wash water and contaminants removed from dishes, and discharges only the contaminant-free wash water. Then, the filter 240 collects the contaminants removed from the dishes.

The circulator 250 is arranged between the water collector 220 and the injector 260. The circulator 250 includes a circulation pump 251 to pump, to the injector 260, water collected in the water collector 220 after being filtered by the filter 240, and a circulation tube 252 to guide the pumped water to the injector 260.

The circulator 250 circulates water collected in the water collector 220 by pumping the water from the water collector 220 and supplying the pumped water to the injector 260 through the circulation tube 252.

The injector 260 includes a first injection nozzle 261, a second injection nozzle 262, and a third injection nozzle 263, which are installed at bottom, middle and top portions of the wash chamber 12 within the wash chamber 12, respectively, to inject water onto dishes received in the baskets 161 and 162.

The first and second injection nozzles 261 and 262 are rotatably installed at the bottom and middle portions of the wash tub 130, respectively, whereas the third injection nozzle 263 is fixedly installed at the top portion of the wash tub 130.

The drainer 270 outwardly drains water from the water collector 220. The drainer 270 includes a drainage pump 271 to pump water from the water collector 220, and a drainage tube 272 to guide the water pumped by the drainage pump 271. The drainer 270 may further include a drainage valve (not shown) to control drainage of water from the water collector 220.

The sterilizer 300, which is also included in the dishwasher 1, produces sterilizing water.

The sterilizer 300 includes a branch tube 310 branched from the water supply tube 211, a reservoir 320 connected to the branch tube 310, and an electrolyzer installed in the reservoir 320, to electrolyze water and thus to produce sterilizing water.

The branch tube 310 is branched from the water supply tube 211 at the water supply valve 212. The water supply valve 212 is a flow path change valve to change a flow path of water to be supplied to the water collector 220 and reservoir 320.

The water supply valve 212 includes a first flow passage to connect the water collector 220 and reservoir 320, and a second flow passage to connect the water collector 220 and an external water service pipe. The water supply valve 212 selectively opens the first flow passage or the second flow passage.

That is, the water supply valve 212 allows wash water stored in the water collector 220 to be introduced into the reservoir 320 or allows sterilizing water in the reservoir 320 to be introduced into the water collector 220 by opening the first flow passage while closing the second flow passage.

Also, the water supply valve 212 allows city service water from the external water service pipe to be introduced into the water collector 220 by closing the first flow passage while opening the second flow passage.

The water supply valve 212 may be divided into a first valve to open or close the first flow passage connected between the water collector 200 and the reservoir 320 and a second valve to open or close the second flow passage connected between the water collector 200 and the water service pipe.

The electrolyzer 330 produces sterilizing water by electrolyzing water in the reservoir 320.

Water subjected to electrolysis in the electrolyzer 330 exhibits sterilizing effects. Sterilization through electrolysis is a technology of sterilizing or killing bacteria present in water by forcing the water to flow between electrodes having different polarities. In the treated water, a mixture of oxidative materials having sterilizing effects such as chlorine ($Cl_2$), hypochlorite ($OCl^-$), other sterilizing ions, and free radicals are produced.

Here, various oxidizing agents such as hypochlorite, chlorine, chlorine dioxide and other chlorine-based oxidizing agents are known as the most effective sterilizing agents used for sanitary purposes in domestic or industrial products.

During non-operation thereof, the dishwasher 1 enhances the sterilization capability thereof by periodically executing operations of producing sterilizing water in the reservoir 320 through operation of the electrolyzer 330 installed in the reservoir 320, and circulating the sterilizing water through the interior of the dishwasher 1, to sterilize the wash chamber, water collector 220, circulator 250, injector 260, drainer 270, etc.

The wash water stored in the reservoir 320 is used as reserve wash water after being sterilized by the electrolyzer 330, in order to increase the solubility of the detergent and to electrolyze the wash water during operation of the dishwasher 1.

Figure 2:
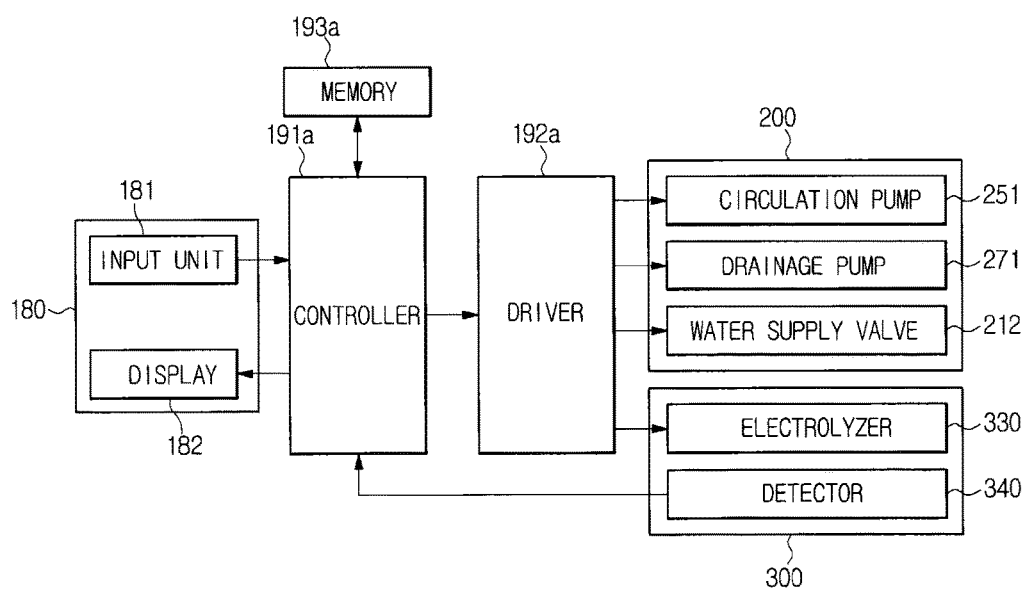
FIG. 2 is a block diagram illustrating a control configuration of the dishwasher according to an exemplary embodiment of the present disclosure.

FIG. 2 is a block diagram illustrating a control configuration of the dishwasher according to an exemplary embodiment of the present disclosure.

As shown in FIG. 2, the dishwasher 1 includes the user interface 180, drive module 190, wash assembly 200, and sterilizer 300.

The user interface 180 receives information input by the user, and displays the input information and operation information.

The user interface 180 includes an input unit 181 to receive operation information input by the user, for example, information as to various wash courses (for example, a normal course, a manual course, etc.) and addition of rinsing, information as to a sterilization mode and a sterilization mode execution interval. The user interface 180 also includes a display 182 to display information as to a wash mode, and the information as to the sterilization mode.

The drive module 190 includes a controller 191a, a driver 192a, and a memory 193a.

The controller 191a executes an algorithm of the wash mode to wash dishes or an algorithm of the sterilization mode to sterilize the interior of the wash tub or the interior of the wash assembly 200.

The driver 192a drives the circulation pump 251, drainage pump 271 and water supply valve 212, which are included in the wash assembly 200, in accordance with commands from the controller 191a. The driver 192a also drives the electrolyzer 330 of the sterilizer 300 and a detector 340 in accordance with commands from the controller 191a.

The memory 193a stores the information as to the sterilization mode, for example, a reference level of water in the reservoir 320 and a reference time for electrolysis.

The detector 280 is a water level detector to detect the level of water in the reservoir 320. The detector 280 is disposed within the reservoir 320.

In more detail, during non-operation of the dishwasher 1, the controller 191a operates the electrolyzer 330 disposed within the reservoir 320, irrespective of the amount of water in the water collector 220, to produce sterilizing water. In this case, the controller 191a detects the level of water in the reservoir 320, and operates the electrolyzer 330 when the amount of water in the reservoir 320 according to the detected water level is equal to or more than a reference water amount.

Here, the reference water amount means a minimum water amount capable of preventing the electrolyzer 330 from overheating due to malfunction thereof caused by shortage of water.

After production of sterilizing water, the controller 191a opens the water supply valve 212, and operates the circulation pump 251, to circulate the sterilizing water in the reservoir 320 through the water supply tube 211, water collector 220, circulation tube 252, and injector 260 in order to sterilize the whole interior of the dishwasher 1.

The sterilization operation during non-operation of the dishwasher 1 is carried out by operating the electrolyzer 330 for 10 to 30 minutes, by use of an application voltage of 12 to 24V, at intervals of 1 to 3 days. In accordance with this sterilization operation, it may be possible to maintain the concentration of contamination bacteria in the interior of the dishwasher 1 at or below a predetermined value.

For example, the sterilizing performance of the sterilizing water produced in accordance with operation of the electrolyzer 330 increases in accordance with the production time of the sterilizing water, and the sterilizing water exhibits useful effects after a production time of 10 minutes or more. After operation of the electrolyzer 330 for 30 minutes or more, the sterilizing water exhibits remarkably enhanced sterilizing effects.

Organic substances may be left in remnant water or stored water due to the characteristics of the dishwasher 1. Such organic substances may interfere with operation of the electrolyzer 330 and production of sterilizing water. However, desired sterilizing effects are still provided because such sterilizing effects are exhibited after operation of the electrolyzer 330 for 10 minutes or more.

Meanwhile, bacteria again begin multiplication thereof after a certain time elapses from sterilization, and may be recovered to an amount before sterilization after one day.

The same results are exhibited even when sterilization is carried out at a high temperature of 80° C. or more. When high-temperature sterilization is carried out, a fatal disease may be generated when pathogenic bacteria exhibiting strong tolerance to high temperatures is present in the interior of the dishwasher 1 because such pathogenic bacteria may be easily adapted to high temperatures.

When the electrolyzer 330, which exhibits a performance equal to or higher than that of the high-temperature sterilization, is used, it may be possible to achieve effective sterilization while reducing power consumption, as compared to high-temperature sterilization.

For maintenance of continuous sterilizing effects, it is necessary to continuously generate radicals and to perform sterilization at intervals of a certain time. When the electrolyzer 330 is driven one or more times at intervals of 1 to 3 days, the amount of bacteria in the dishwasher 1 is adjusted to 1 Log or less and, as such, it may be possible to obtain maximum sterilizing effects.

Meanwhile, cations ($H^+$) additionally generated during production of sterilizing water by the electrolyzer 330 function to promote dissolution of the detergent, which is in a powdered state, in water. Accordingly, when radical-containing water produced in accordance with operation of the electrolyzer 330 is applied to a detergent supply procedure in an initial stage of a wash operation, the solubility of the detergent is increased and, as such, activity of the detergent is enhanced.

Also, during electrolysis, micro bubbles are formed by gas generated in accordance with combination of hydrogen and oxygen. By these micro bubbles, substances of the detergent, for example, a carbonate or the like, which are not dissolved in water, are dispersed. Also, ingredients of the detergent react with radicals. Thus, activity of the detergent is further increased and, as such, an enhancement in washability is obtained. Since the increased detergent activity results in an enhancement in wash performance, there may be effects of enhancing both the sterilizing performance and the wash performance.

Meanwhile, during operation of the dishwasher 1, the controller 191a operates the electrolyzer 330, to electrolyze wash water stored in the reservoir 320. Also, the controller 191a opens the water supply valve 212 and operates the circulation pump 251, for circulation of sterilizing water in the reservoir 320 and city service water introduced into the water collector 220.

In this case, ingredients produced by the electrolyzer 330, namely, ingredients capable of killing bacteria in wash water (for example, hypochlorite and HClO) and ingredients capable of promoting activity of the detergent (for example, cations and H⁺) are contained in the introduced city service water.

Thereafter, the controller 191a executes a series of normal wash operations such as a preliminary wash operation, a main wash operation, and a rinsing operation. After completion of the normal wash operations, the controller 191a opens the water supply valve 212, to allow final rinsing water to be stored in the reservoir 320 without being drained as waste water, and then closes the water supply valve 212.

Thus, the wash water stored in the reservoir 320 may be applied to sterilization operation during non-operation of the dishwasher 1. The wash water stored in the reservoir 320 may also be used in detergent dissolution and sterilization operations during a next operation of the dishwasher 1.

Hereinafter, operation of the dishwasher according to an exemplary embodiment of the present disclosure will be described in detail.

Figure 3A:
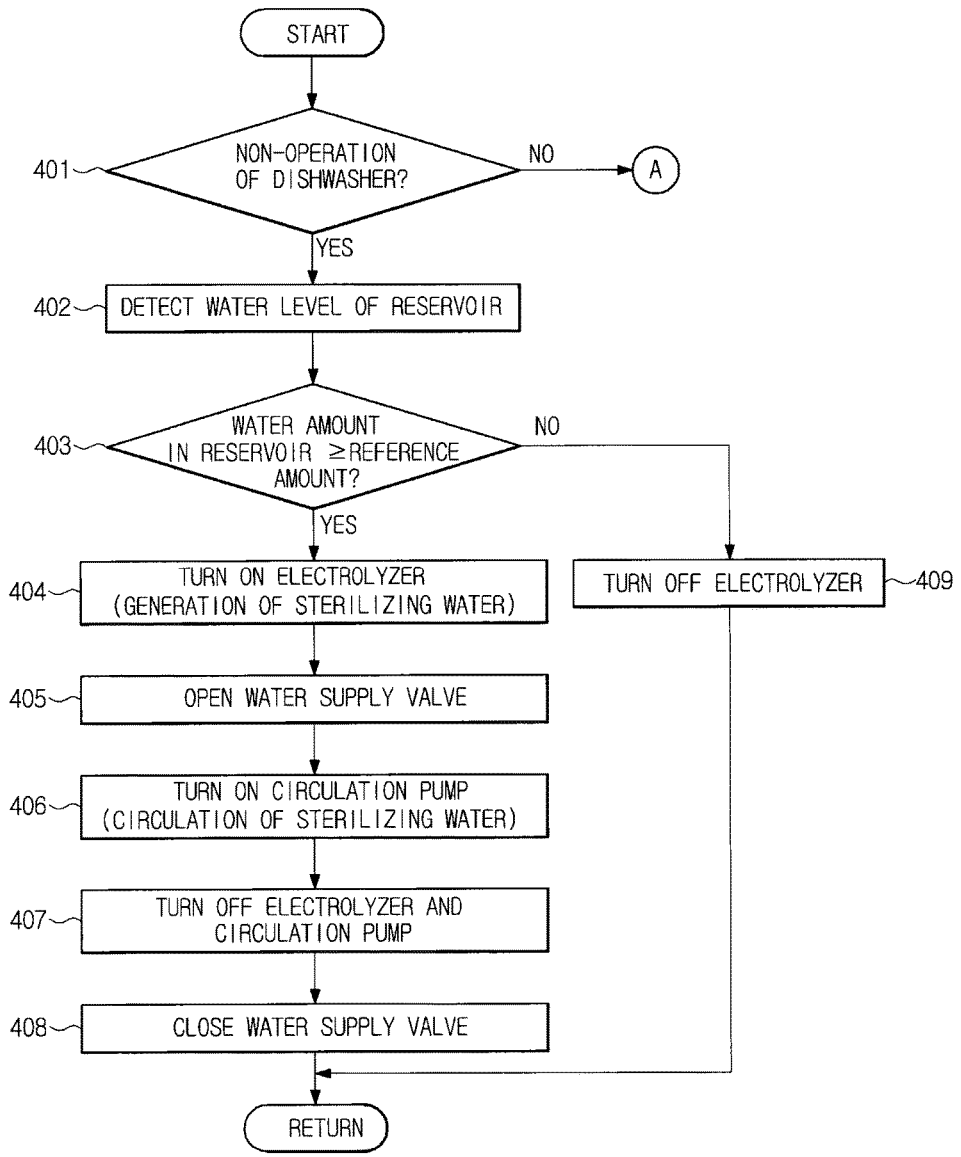
FIGS. 3A and 3B are flowcharts illustrating a control operation of the dishwasher according to an exemplary embodiment of the present disclosure.
Figure 3B:
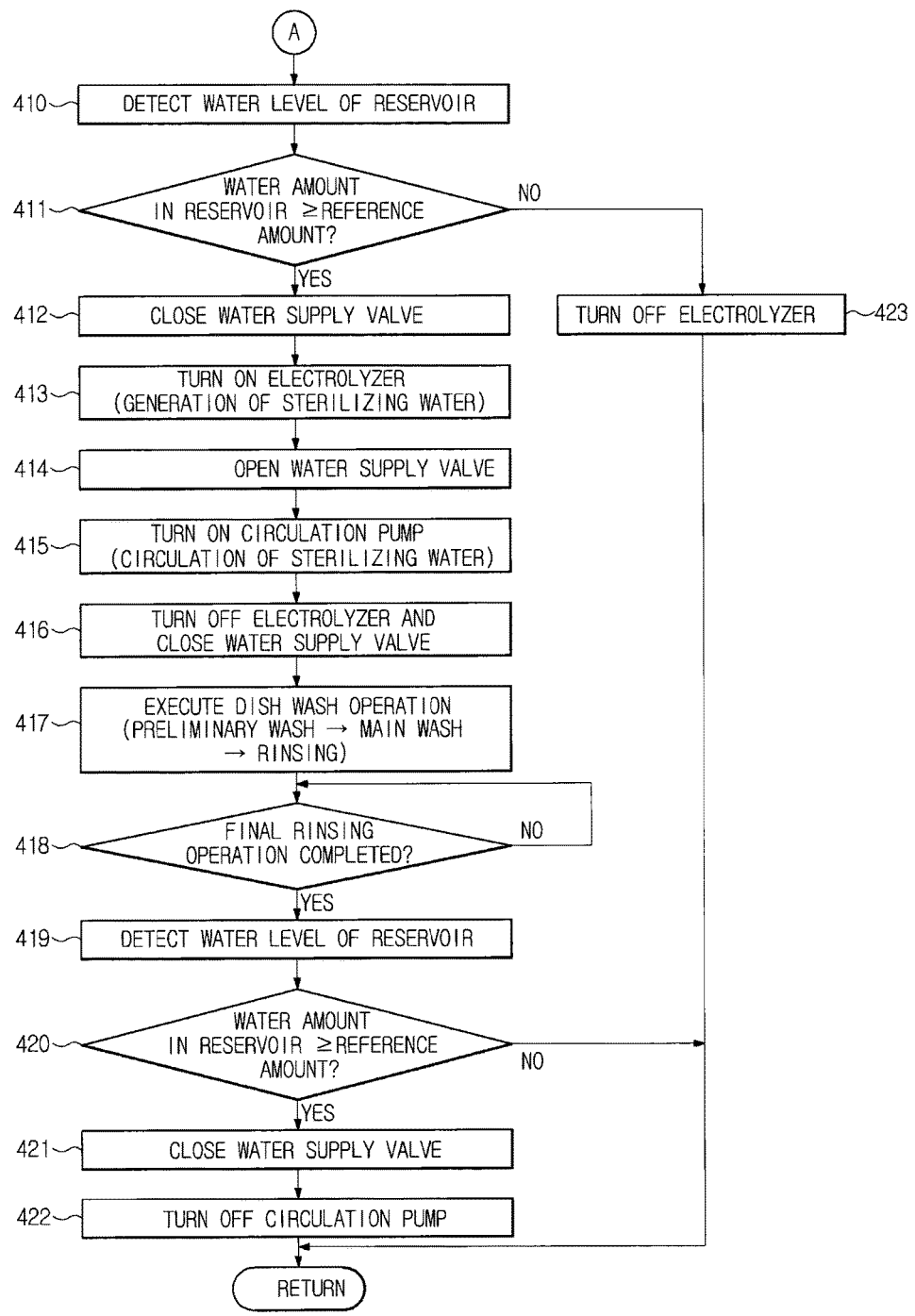

FIGS. 3A and 3B are flowcharts illustrating a control operation of the dishwasher according to an exemplary embodiment of the present disclosure.

Referring to FIGS. 3A and 3B, the dishwasher 1 determines whether the dishwasher 1 is in a non-operation state (401).

When it is determined, in operation 401, that the dishwasher 1 is in a non-operation state, the dishwasher 1 detects the water level of the reservoir 320 (402), and determines, based on the results of the detection, whether the amount of water in the reservoir 320 is equal to or more than a reference amount (403).

When it is determined, in operation 403, that the amount of water in the reservoir 320 is equal to or more than the reference amount, the dishwasher 1 turns on the electrolyzer 330 (404). Accordingly, the wash water in the reservoir 320 is sterilized, and sterilizing water is produced.

The dishwasher 1 also opens the water supply valve 212 (405), and turns on the circulation pump 251 (406). As a result, the sterilizing water in the reservoir 320 performs sterilization while circulating through the interior of the dishwasher 1.

After execution of sterilization for a predetermined time, the dishwasher 1 turns off the electrolyzer 330, and turns off the circulation pump 251 (407).

Also, the dishwasher 1 closes the water supply valve 212, to allow the wash water stored in the reservoir 320 to be used as reserve wash water when the dishwasher 1 operates (408). As a result, the sterilizing water is stored in the reservoir 320.

On the other hand, when it is determined, in operation 403, that the amount of water in the reservoir 320 is less than the reference amount, the dishwasher 1 turns off the electrolyzer 330 in order to prevent the electrolyzer 330 from overheating due to malfunction thereof caused by shortage of water (409).

On the other hand, when it is determined, in operation 401, that operation of the dishwasher 1 is begun, the dishwasher 1 detects the water level of the reservoir 320 (410), and determines, based on the results of the detection, whether the amount of water in the reservoir 320 is equal to or more than the reference amount (411).

When it is determined, in operation 411, that the amount of water in the reservoir 320 is equal to or more than the reference amount, the dishwasher 1 closes the water supply valve 212 (412), and turns on the electrolyzer 330 (413). Accordingly, the wash water in the reservoir 320 is sterilized, and sterilizing water is produced.

After production of sterilizing water for a predetermined time, the dishwasher 1 opens the water supply valve 212 (414), and turns on the circulation pump 251 (415). As a result, the sterilizing water in the reservoir 320 performs sterilization while circulating through the interior of the dishwasher 1.

Thus, the sterilizing water in the reservoir 320 is used as reserve wash water. In this case, the water supply valve 212 not only opens the flow passage connected to the reservoir 320, but also opens the flow passage connected to the water service pipe, to receive city service water.

In this case, ingredients produced by the electrolyzer 330, namely, ingredients capable of killing bacteria in wash water (for example, hypochlorite and HClO) and ingredients capable of promoting activity of the detergent (for example, cations and H⁺) are contained in the introduced municipal water service.

After a predetermined reference time elapses, the dishwasher 1 turns off the electrolyzer 330, and closes the water supply valve 212. In this case, the water supply valve 212 closes the reservoir-side flow passage while opening the water supply-side flow passage.

Thereafter, the dishwasher 1 executes a dish wash operation including the preliminary wash operation, main wash operation and rinsing operation (417).

Meanwhile, the dishwasher 1 determines, during execution of the dish wash operation, whether a final rinsing operation has been completed (418). After completion of the final rinsing operation, the dishwasher 1 detects the water level of the reservoir 320 (419), and determines, based on the results of the detection, whether the amount of water in the reservoir 320 is equal to or more than a reference amount (420). When the amount of water in the reservoir 320 is equal to or more than the reference amount, the dishwasher 1 closes the water supply valve 212 (421), and turns off the circulation pump 251 (422)

As a result, final rinsing water is not drained after completion of a series of normal wash operations including the preliminary wash operation, main wash operation and rinsing operation. The final rinsing water is stored in the reservoir 320, to be used as reserve wash water during non-operation of the dishwasher 1, for detergent dissolution and sterilization operations.

On the other hand, when it is determined, in operation 411, that the amount of water in the reservoir 320 is less than the reference amount, the dishwasher 1 turns off the electrolyzer 330 in order to prevent the electrolyzer 330 from overheating due to malfunction thereof caused by shortage of water (423).

As described above, during non-operation of the dishwasher 1, it may be possible to kill bacteria generated within the interior of the dishwasher 1 through a sterilization operation including generating sterilizing water in the reservoir 320 in accordance with periodic operation of the electrolyzer 330 carried out irrespective of the amount of water in the water collector 220, and circulating the sterilizing water through the interior of the dishwasher 1.

In particular, in the case of a conventional dishwasher, a bacteria concentration of 7 Log (CFU/mL) or more that is a harmful level, is typically exhibited in the interior of the conventional dishwasher. It may be possible to greatly reduce the initial bacteria concentration in an initial stage of the wash operation of the dishwasher by remarkably reducing the concentration of remnant bacteria to 1 Log (CFU/mL) through periodic sterilization operation.

Reducing the initial bacteria concentration provides a great enhancement in contaminant removal performance, upon taking into consideration the survival properties of bacteria increasing rapidly with the passage of time and prolonged contamination of the dishwasher.

It may also be possible to kill even bacteria exhibiting tolerance to heat, differently than the sterilization using heat. In this regard, it may be possible to kill even the recently-known pathogenic bacteria exhibiting tolerance to heat.

Micro bubbles and cations ($H^+$) generated in the procedure of producing sterilizing water are elements capable of maximizing dissolution and activity of the detergent when applied to the initial stage of the wash operation. Accordingly, it may be possible to achieve an enhancement in wash performance.

Figure 4:
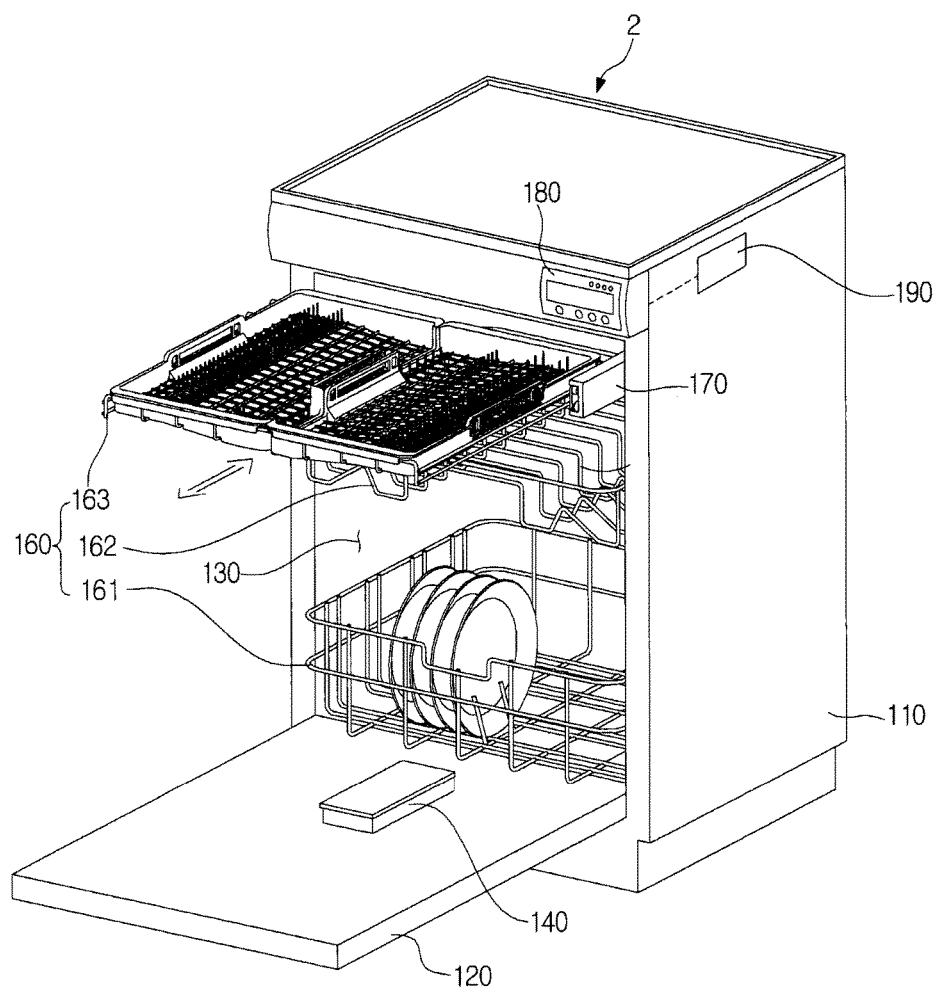
FIG. 4 is a perspective view of a dishwasher according to another embodiment of the present disclosure.
Figure 5A:
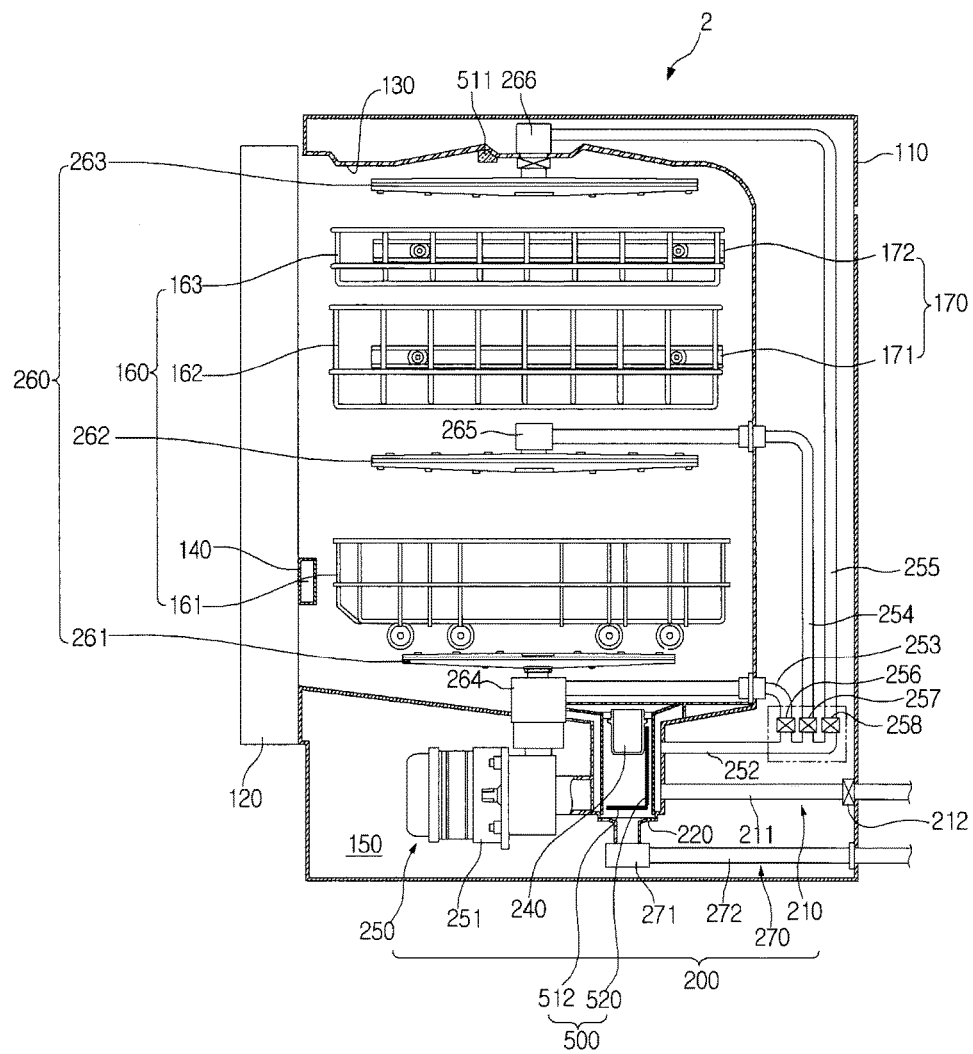
FIGS. 5A and 5B are sectional views illustrating an inner configuration of the dishwasher according to the embodiment of FIG. 4.
Figure 5B:
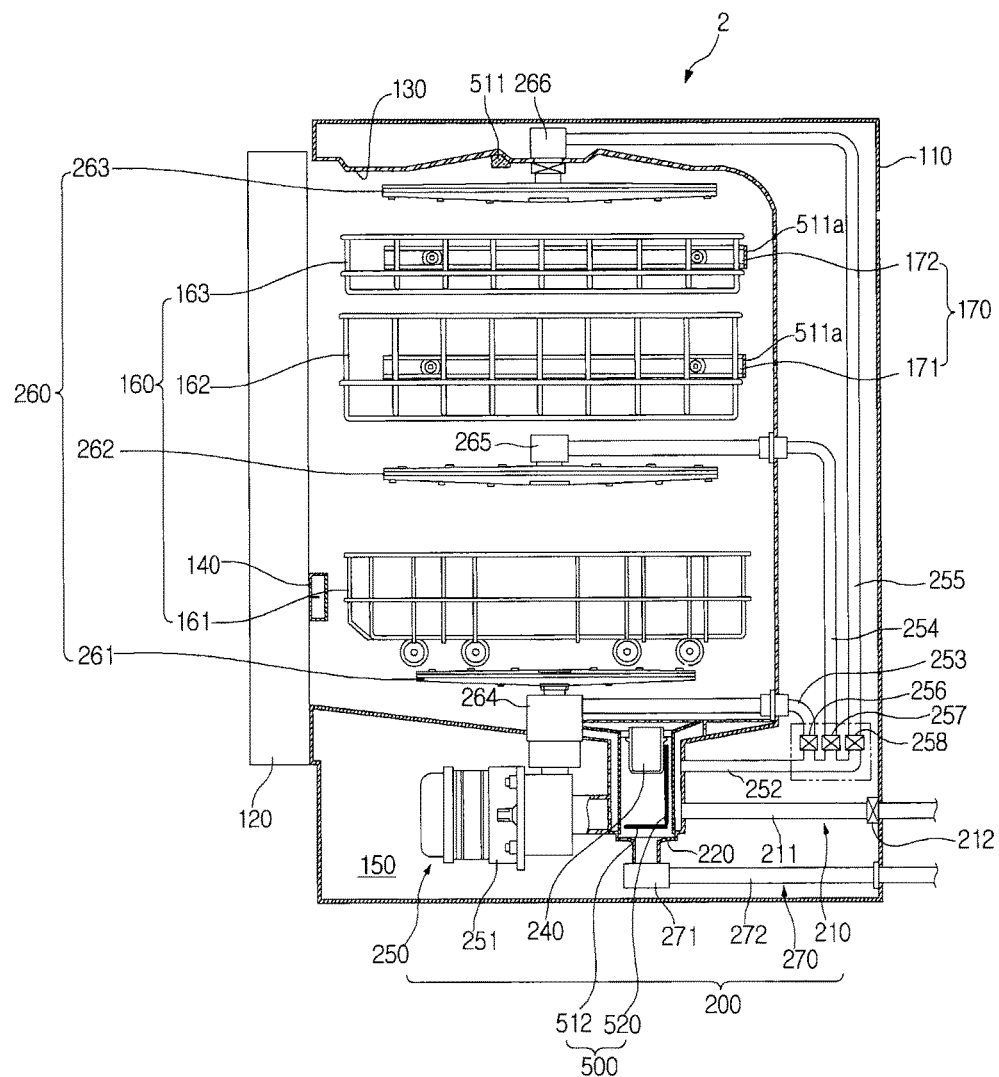

FIG. 4 is a perspective view of a dishwasher according to another embodiment of the present disclosure. FIGS. 5A and 5B are sectional views illustrating an inner configuration of the dishwasher according to the embodiment of FIG. 4. Referring to FIGS. 4 and 5B, the dishwasher, which is designated by reference numeral "2", includes a body 110, a door 120, a wash tub 130, a detergent storage unit 140, a machinery chamber 150, a receiver 160, a guide 170, a user interface 180, a drive module 190, a wash assembly 200, and a sterilizer 500.

The body 110, door 120, wash tub 130, detergent storage unit 140, machinery chamber 150, guide 170, and user interface 180 in the dishwasher 2 according to the embodiment of FIG. 4 are identical to those of FIG. 1 and, as such, no description thereof will be given.

The receiver 160, which is included in the dishwasher 2, receives dishes.

The receiver 160 includes a first basket 161, a second basket 162, and a cutlery basket 163, which are disposed in the wash tub 130. The first basket 161, second basket 162 and cutlery basket 163 have holes of various sizes, through which water injected from a plurality of injection nozzles 261, 262 and 263 pass.

On the basis of a bottom surface of the wash tub 130, the first basket 161 is disposed at a lower portion of the wash tub 130, the second basket 162 is disposed at a middle portion of the wash tub 130, and the cutlery basket 163 is disposed at an upper portion of the wash tub 130.

The first basket 161 receives various tableware such as bowls, dishes and kitchen utensils to be washed. The second basket 162 receives cups or the like. The cutlery basket 163 receives forks, table knives, spoons, chopsticks, kitchen knives, ladles, or the like.

A first guide 171 and a second guide 172 are also installed in the wash tub 130. The first guide 171 supports the second basket 162 and guides extraction and retraction of the second basket 162 in forward and backward directions through the wash tub 130. The second guide 172 supports the cutlery basket 163 and guides extraction and retraction of the cutlery basket 163 in forward and backward directions through the wash tub 130.

Although not shown, the dishwasher 2 further includes a guide to support the first basket 161 and to guide extraction and retraction of the first basket 161 in forward and backward directions through the wash tub 130.

The user interface 180 receives operation information associated with a wash mode set in accordance with a command from the user, and displays information as to an operation in progress.

The wash mode includes at least one of a wash operation to wash dishes through injection of wash water onto the dishes, a rinsing operation to rinse dishes through injection of rinsing water onto the dishes, and a drying operation to dry completely-rinsed dishes.

The user interface 180 also receives information as to a sterilization mode and a sterilization mode execution interval, and displays information associated with the sterilization mode.

The sterilization mode includes preliminary and main sterilization operations to sterilize the wash tub 130 and wash assembly 200 through circulation of sterilizing water in the wash assembly 200 and injection of the circulated sterilizing water in the wash tub, and a rinsing operation to remove sterilizing water from the wash tub 130 and wash assembly 200.

Each of the wash operation, preliminary sterilization operation, main sterilization operation, and rinsing operation includes a water supply mode to supply water for washing, sterilization or rinsing, a circulation mode to circulate wash water, sterilizing water or rinsing water, a heating mode to heat wash water, sterilizing water or rinsing water, and a drainage mode to outwardly drain wash water, sterilizing water or rinsing water.

The drive module 190 executes an algorithm of the wash mode to wash dishes or an algorithm of the sterilization mode to sterilize the interior of the wash tub 130 or the interior of the wash assembly 200 on the basis of operation information input to the user interface 180.

The wash assembly 200 includes constituent elements for washing of dishes. This will be described in more detail with reference to FIGS. 5A and 5B.

The wash assembly 200 includes a water supplier 210, a water collector 220, a filter 240, a circulator 250, an injector 260, and a drainer 270. The constituent elements identical to those of the previous embodiment will be described briefly.

The water supplier 210 is arranged between an external water supply source and the water collector 220. The water supplier 210 includes a water supply tube 211 to guide water supplied from the external water supply source to the water collector 220, and a water supply valve 212 to allow or prevent supply of water from the external water supply source to the water collector 220.

The water collector 220 stores water introduced through the water supply tube 211.

The water stored in the water collector 220 is used as wash water in the wash mode while being used as rinsing water in the wash mode and sterilization mode, under the condition that a detergent is dissolved in the water. The water in the water collector 220 is also used as sterilizing water in the preliminary and main sterilization operations in the sterilization mode.

The wash water, rinsing water or sterilizing water circulates through the wash tub 130, water collector 220, circulator 250 and injector 260.

The filter 240 separates wash water from a mixture of wash water and contaminants removed from dishes, and discharges only the contaminant-free wash water into the water collector 220.

The circulator 250 is arranged between the water collector 220 and the injector 260. The circulator 250 pumps water from the water collector 220, to supply the pumped water to the injector 260 via circulation tubes 252 to 255.

The circulator 250 includes a circulation pump 251 to pump water from the water collector 220. The circulation tubes 252 to 255 are also included in the circulator 250. The circulation tubes 252 to 255 guide the pumped water to the injector 260. The circulator 250 also includes valves 256, 257 and 258 respectively provided at the circulation tubes 253 to 255, to control circulation of the pumped water.

The circulation pump 251 may pump water supplied from an external water supply source in the water supply mode.

The circulation tubes 252 to 255 include a main tube 252 to guide water discharged from the circulation pump 251, and first to third branch tubes 253, 254 and 255 branched from the main tube 252, to guide water to nozzles 261 to 263, respectively.

In more detail, the first branch tube 253 branched from the main tube 252 guides water to the first injection nozzle 261. The second branch tube 254 guides water to the second injection nozzle 262. The third branch tube 255 guides water to the third injection nozzle 263.

The first valve 256 is arranged at the first branch tube 253, whereas the second valve 257 is arranged at the second branch tube 254. The third valve 258 is arranged at the third branch tube 255.

The first valve 256 controls flow of water supplied to the first injection nozzle 261 in accordance with a command from a controller 191b. The second valve 257 controls flow of water supplied to the second injection nozzle 262 in accordance with a command from the controller 191b. The third valve 258 controls flow of water supplied to the third injection nozzle 263 in accordance with a command from the controller 191b.

The injector 260 injects water supplied through the circulator 250 onto various dishes received in the first and second baskets 161 and 162 and cutlery basket 163.

The injector 260 includes a first injection nozzle 261 disposed beneath the first basket 260, a second injection nozzle 262 disposed between the first basket 161 and the second basket 162, and a third injection nozzle 263 disposed over the cutlery basket 163.

The injector 260 also includes a first rotor 264 provided at the first injection nozzle 261, to rotate by the hydraulic pressure of water supplied from the circulator 250, a second rotor 265 provided at the second injection nozzle 262, to rotate by the hydraulic pressure of water supplied from the circulator 250, and a third rotor 266 provided at the third injection nozzle 263, to rotate by the hydraulic pressure of water supplied from the circulator 250.

The first nozzle 261 rotates in accordance with rotation of the first rotor 264 generated by injection of wash water. The second nozzle 262 rotates in accordance with rotation of the second rotor 265 generated by injection of wash water. The third nozzle 263 rotates in accordance with rotation of the third rotor 266 generated by injection of wash water.

The first injection nozzle 261 includes a plurality of injection holes formed at the top of the first injection nozzle 261. Through the injection holes, the first injection nozzle 261 injects water in an upward direction. The second injection nozzle 262 includes a plurality of injection holes formed at the top and bottom of the second injection nozzle 262. The second injection nozzle 262 injects water in upward and downward directions through the injection holes thereof. The third injection nozzle 263 includes a plurality of injection holes formed at the bottom of the third injection nozzle 263. The third injection nozzle 263 injects water in a downward direction through the injection holes thereof.

The first injection nozzle 261 receives water via the first branch tube 253, whereas the second injection nozzle 262 receives water via the second branch tube 254. The third injection nozzle 263 receives water via the third branch tube 255.

The drainer 270 outwardly drains water from the water collector 220. The drainer 270 includes a drainage pump 271 to pump water from the water collector 220, and a drainage tube 272 to outwardly guide the water pumped by the drainage pump 271.

The sterilizer 500 produces sterilizing water to sterilize the interior of the wash tub 130 and the interior of the wash assembly 200 in the sterilization mode. The sterilizer 500 includes detectors 510 (511 and 512), and a heater 520.

Although the sterilizer 500 produces sterilizing water to be used in the sterilization operation of the sterilization mode, it may also produce sterilizing water to be used in the preliminary sterilization operation. In this case, the temperature of the sterilizing water to be used in the preliminary sterilization operation is lower than that of the sterilizing water to be used in the main sterilization operation.

The detector 510 detects the environment of the interior of the wash tub 130, for execution of the sterilization mode.

As shown in FIG. 5A, the detector 510 includes a dish detector 511 to detect whether there are dishes in the wash tub 130, a water level detector 512 disposed in the wash tub 130, to detect the level of water in the wash tub 130, and a temperature detector 513 disposed in the water collector 220, to detect the temperature of water in the water collector 220.

The dish detector 511 detects whether a dish, which functions as an element to interfere with execution of sterilization of the interior of the wash tub 130, is disposed in the wash tub 130, in order to achieve an enhancement in sterilization performance in execution of the sterilization mode.

The dish detector 511 includes a sensor selectively arranged at the top of the wash tub 130 or the bottom of the wash tub 130, to detect dishes received in the first basket, second basket and cutlery basket. The sensor may be an acoustic sensor, a radio wave sensor, and an optical sensor.

For example, the dish detector 511 may include an optical sensor including a light emitter to emit light and a light receiver to detect an amount of light emitted from the light emitter. In this case, the controller determines that there are dishes in the wash tub 130, when the detected light amount is equal to or less than a reference light amount. On the other hand, when the detected light amount exceeds the reference light amount, the controller determines that there are no dishes in the wash tub 130.

As shown in FIG. 5B, the dish detector 511 may be provided at each of the first basket 161, second basket 162 and cutlery basket 163.

In this case, the dish detector 511 includes weight sensors 511a respectively disposed at the guides 171 and 172, to which the second basket 162 and cutlery basket 163 are mounted, to detect weights of the second basket 162 and cutlery 163.

Although not shown, the dish detector 511 further includes a weight sensor disposed at a guide, to which the first basket 161 is mounted, to detect the weight of the first basket 161.

In this case, the controller determines that there are dishes in the wash tub 130 when the detected weight is equal to or greater than a reference weight. On the other hand, when the detected weight is smaller than the reference weight, the controller determines that there are no dishes in the wash tub 130.

The heater 520 is disposed around the water collector 220. The heater 520 is driven in accordance with a command from a controller 191 b, to heat water in the water collector 220 to a sterilization temperature.

As the heater 520, the heater 230, which is used in the previous embodiment, to heat wash water for washing of dishes, may be used. Alternatively, a separate heater may be used as the heater 520.

When both the heater for washing of dishes and the heater for generation of sterilizing water are used, they may have different capacities.

Figure 6:
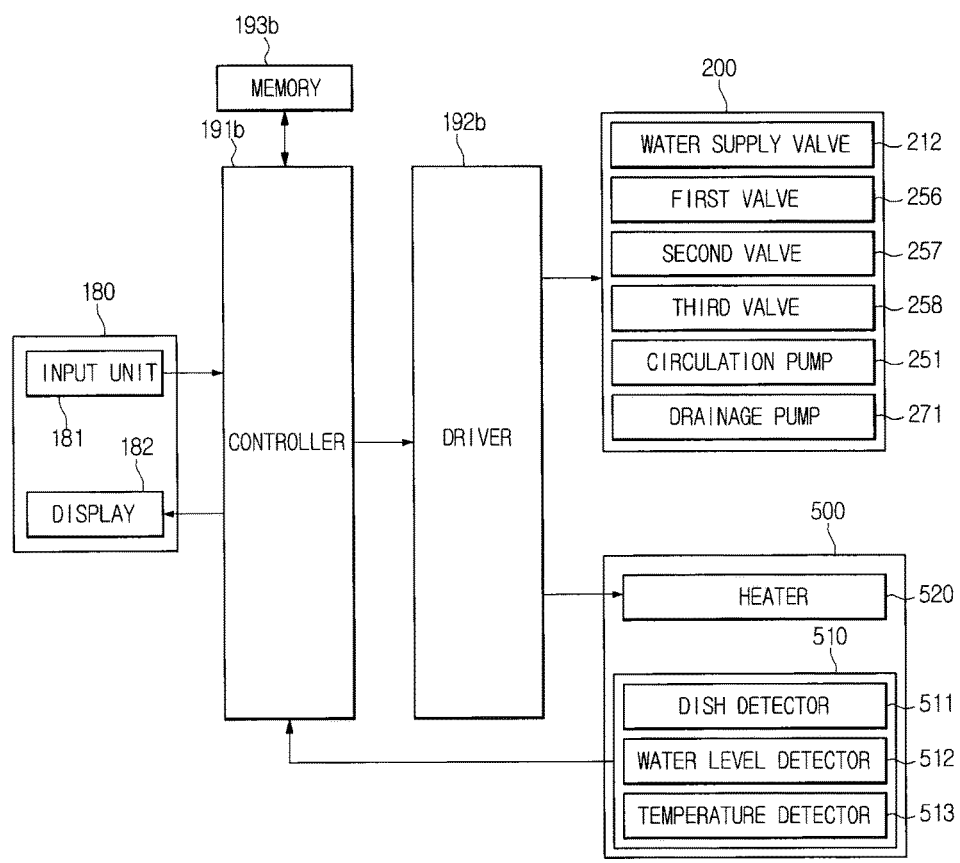
FIG. 6 is a block diagram illustrating a control configuration of the dishwasher 2 according to another exemplary embodiment of the present disclosure.

FIG. 6 is a block diagram illustrating a control configuration of the dishwasher 2 according to another exemplary embodiment of the present disclosure. The dishwasher 2 includes the user interface 180, drive module 190, wash assembly 200, and sterilizer 500.

The user interface 180 includes an input unit 181 to receive operation information input by the user in association with washing of dishes, and a display 182 to display information as to an operation in progress during washing of dishes.

The input unit 181 of the user interface 180 also receives information as to a sterilization mode and a sterilization mode execution interval. In this case, the display 182 displays information associated with execution of the sterilization mode.

The display 182 of the user interface 180 also displays whether there are dishes received in the wash tub 130, before entrance of the sterilization mode.

The information as to the sterilization mode includes a sterilization mode execution elapsed time, a residual sterilization mode execution time, residual operation information, execution schedule information of a next sterilization mode, etc. The residual operation information includes information as to the execution time of a rinsing operation to remove the sterilizing agent left in the wash tub 130 or the number of times to execute the rinsing operation.

The wash assembly 200 drives the water supplier 210, circulator 250, and drainer 270 in the wash mode in accordance with a control command from the controller 191b, for collection, circulation, injection and drainage of wash water.

In the sterilization mode, the wash assembly 200 circulates sterilizing water and rinsing water. In this case, the interiors of the wash tub 130 and wash assembly 200 are washed and sterilized by the sterilizing water circulating through the wash assembly 200. Subsequently, the sterilizing water is removed from the interiors of the wash tub 130 and wash assembly 200 by the rinsing water circulating through the wash assembly 200.

The sterilizer 500 drives the detector 510 and heater 520 in the sterilization mode in accordance with a control command from the controller 191b, to produce sterilizing water for sterilization.

In this case, the detector 510 detects the environment of the interior of the wash tub 130, for execution of the sterilization mode.

The dish detector 511 detects whether there are dishes in the receiver 160 disposed within the wash tub 130, and transmits information as to the results of the detection to the controller 191b. The dish detector 511 includes one of a weight sensor, an acoustic sensor, a radio wave sensor, and an optical sensor.

The water level detector 512 detects an amount of water in the wash tub 130 or water collector 220, and transmits information as to the results of the detection to the controller 191b.

The temperature detector 513 detects the temperature of water collected in the water collector 220, and transmits information as to the results of the detection to the controller 191b.

As the water level detector 512 and temperature detector 513, those employed for washing of dishes may be used, or separate detectors associated with execution of sterilization may be used.

The detector 510 may further include an odor detector (not shown) to detect an amount of offensive odor generated due to gas present in the wash tub 130. In this case, the odor detector (not shown) is used to determine when the sterilization mode should be executed.

The drive module 190 controls and drives various loads for execution of the wash mode and sterilization mode. The drive module 190 includes, in addition to the controller 191b, a driver 192b and a memory 193b.

The controller 191b receives operation information for washing of dishes and operation information for sterilization of the interior of the wash tub 130 via the user interface 180. The controller 191b controls display of the received operation information and information as to an operation in progress.

When the operation information input to the user interface 180 represents the wash mode, the controller 191b controls the detergent storage unit 140 to be opened for discharge of the detergent. The controller 191b also controls driving of the wash assembly 200, for execution of a wash operation, a rinsing operation and a drying operation.

In more detail, in the wash mode, the controller 191b controls driving of the water supplier 210, and controls closing of the water supply valve 212, based on the water level detected by the water level detector 512. When supply of water is completed, the controller 191b controls driving of the circulation pump 251 of the circulator 250 and the valves 256, 257 and 258, to cause circulation of water collected in the water collector 220. When the wash mode is completed, the controller 191b controls driving of the drainage pump 271 of the drainer 270, to outwardly drain water used for washing.

When the controller 191b determines that the operation information input through the user interface 180 represents the sterilization mode or the current point of time is a time when the sterilization mode is to be executed, the controller 191b determines whether there are dishes in the wash tub 130. When it is determined that there are no dishes in the wash tub 130, the controller 191b controls entrance of the sterilization mode.

The controller 191b controls sterilization and rinsing operations to wash and sterilize the wash tub 130 and wash assembly 200 after entrance of the sterilization mode.

In more detail, the controller 191b controls driving of the water supply valve 212 and heater 520, based on information detected by the detector 510, for production of sterilizing water for the sterilization operation. When production of sterilizing water is completed, the controller 191b controls driving of the circulator 250, for injection of the sterilizing water. After completion of the sterilization operation, the controller 191b controls driving of the drainer 270, for outward drainage of the sterilizing water.

For circulation of sterilizing water, the controller 191b controls the circulation pump 251 to turn on, and controls the valves 256, 257 and 258 to be opened. For drainage of sterilizing water, the controller 191b controls the drainage pump 271 to turn on.

In this case, the sterilizing water is received in the wash tub 130 to a reference water level, and has a reference temperature suitable for sterilization.

In the sterilization mode, the controller 191b controls driving of the water supplier 210 for supply of sterilizing water during execution of the rinsing operation, controls driving of the circulator 250 for circulation of rinsing water, and controls driving of the drainer 270 for drainage of rinsing water.

The rinsing operation in the sterilization mode may be executed before and after the sterilization operation.

In the wash mode, the driver 192b drives the water supply valve 211 of the water supplier 210 and the circulation pump 251, first valve 256, second valve 257 and third valve 258 of the circulator 250 in accordance with a control signal from the controller 191 b, for circulation of wash water to wash dishes. The driver 192b also drives the drainage pump 271 of the drainer 270 in accordance with a control signal from the controller 191b, for outward drainage of water used to wash dishes.

In the sterilization mode, in accordance with control signals from the controller 191b, the driver 192b drives the heater 520 for production of sterilizing water, drives the water supply valve 211 of the water supplier 210 and the circulation pump 251, first valve 256, second valve 257 and third valve 258 of the circulator 250 for circulation of the sterilizing water, and drives the drainage pump 271 of the drainer 270 for outward drainage of the sterilizing water.

The memory 193b stores a predetermined sterilization interval and a reference water temperature, at which water is sterilizable in the main sterilization operation.

The memory 193b stores a first reference water level and a first reference time, which are suitable for the preliminary sterilization operation, a second reference water level and a second reference time, which are suitable for the main sterilization operation, and a third reference water level and a third reference time, which are suitable for the rinsing operation.

The first, second and third reference water levels may be equal or different. Also, the first and third reference times may be equal or different.

The memory 193b also stores the execution time of the main sterilization operation in the sterilization mode and the number of times to execute the main sterilization operation in the sterilization mode, the number of times to execute the preliminary sterilization operation in the sterilization mode, and the number of times to execute the rinsing operation in the sterilization mode.

When the number of times to execute the preliminary sterilization operation is more than 1, namely, two or more preliminary sterilization operations are executed, the execution times of the preliminary sterilization operations may be equal or different. When the number of times to execute the rinsing operation is more than 1, namely, two or more rinsing operations are executed, the execution times of the rinsing operations may be equal or different.

The memory 193b may also store a reference contamination degree to determine the number of times to execute the preliminary sterilization operation and the number of times to execute the rinsing operation.

Figure 7:
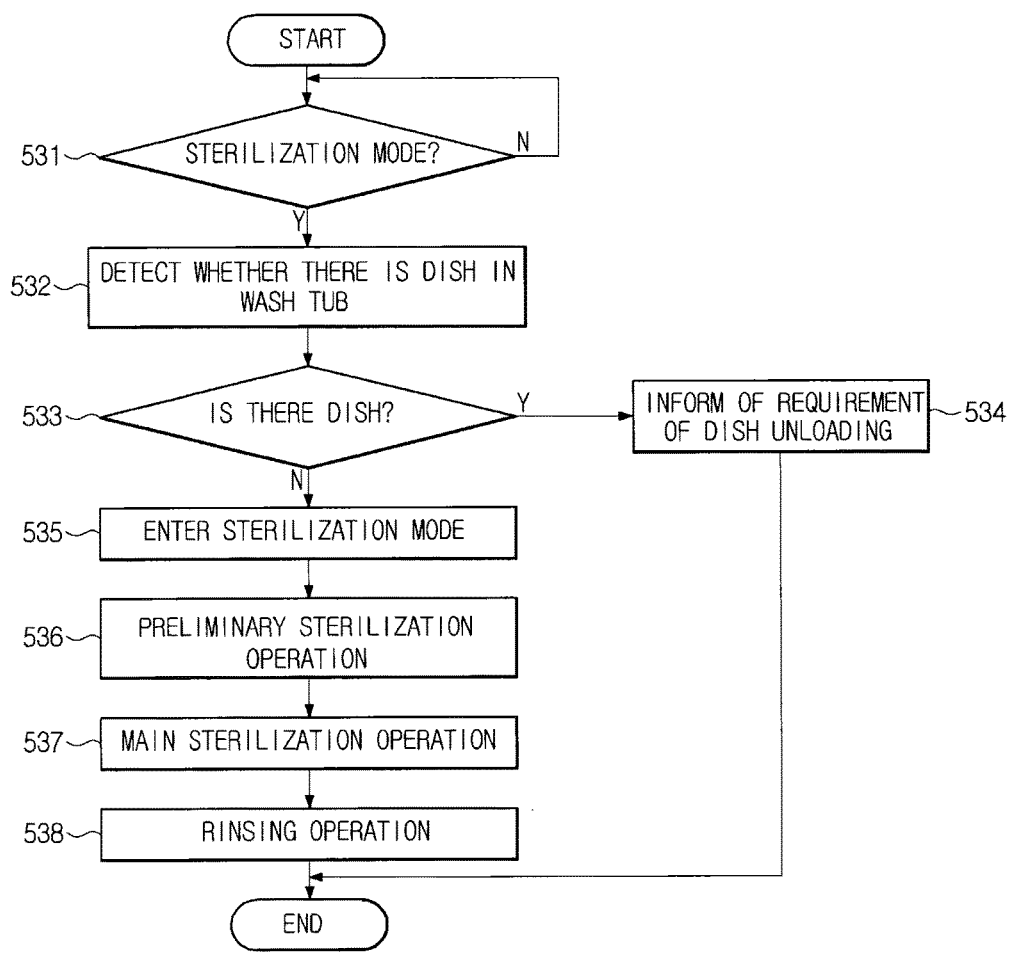
FIG. 7 is a flowchart illustrating a control operation of the dishwasher according to the embodiment of FIG. 6.

FIG. 7 is a flowchart illustrating a control operation of the dishwasher according to the embodiment of FIG. 6.

As shown in FIG. 7, the dishwasher 2 determines whether the sterilization mode is to be executed (531).

Determination of execution of the sterilization mode includes determination of whether a command for execution of the sterilization mode has been input to the user interface 180, determination of whether the current point of time is a time when the sterilization mode is to be executed in accordance with a predetermined sterilization mode execution interval, or determination of whether the amount of offensive odor detected by the odor detector (not shown) is equal to or more than a reference amount.

Thereafter, the dishwasher 2 executes detection of a dish in the wash chamber, using the dish detector 511 (532), and determines whether there are dishes in the wash chamber, based on detection information from the dish detector 511 (533). When it is determined that there are dishes in the wash chamber, the dishwasher 2 informs the user of requirement of dish unloading (534). After dish unloading, the dishwasher 2 again informs the user of input of the sterilization mode execution command.

On the other hand, when it is determined that there are no dishes in the wash chamber, the dishwasher 2 enters the sterilization mode for sterilization of the wash tub 130 and wash assembly 200 (535).

The dishwasher 2 then sequentially executes the preliminary sterilization operation 536, main sterilization operation 537 and rinsing operation 538. In this case, the preliminary sterilization operation may be selectively executed.

Figure 8:
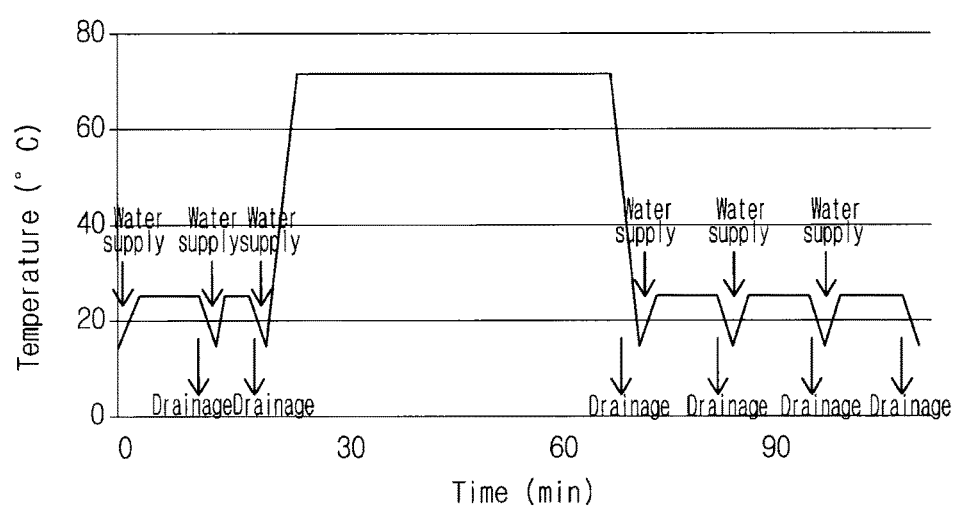
FIG. 8 is a graph depicting execution of a sterilization mode in the dishwasher according to the embodiment of FIG. 6.

Referring to FIG. 8, the dishwasher 2 executes the preliminary sterilization operation 536 by supplying room temperature water, and circulating and injecting the supplied water. After the preliminary sterilization operation 536, the dishwasher 2 drains the water used in the preliminary sterilization operation 536. The preliminary sterilization operation 536 is executed two times.

Thereafter, the dishwasher 2 executes the main sterilization operation 537 by supplying room temperature water, heating the supplied water to a hot sterilization temperature, at which hot sterilization is possible, and circulating and injecting the water heated to the hot sterilization temperature. After the main sterilization operation 537, the dishwasher 2 drains the water used in the main sterilization operation 537. The main sterilization operation 536 is executed once.

Subsequently, the dishwasher 2 executes the rinsing operation 538 by supplying room temperature water, and circulating and injecting the supplied water. After the rinsing operation 538, the dishwasher 2 drains the water used in the rinsing operation 538. The rinsing operation 538 is executed three times.

The preliminary sterilization operation 536 is executed a predetermined number of times or for a predetermined time. The rinsing operation 538 is executed a predetermined number of times or for a predetermined time. The number of times to execute the rinsing operation 538 may be determined, based on information of the contamination degree of rinsing water detected by the contamination degree detector (not shown).

Figure 10:
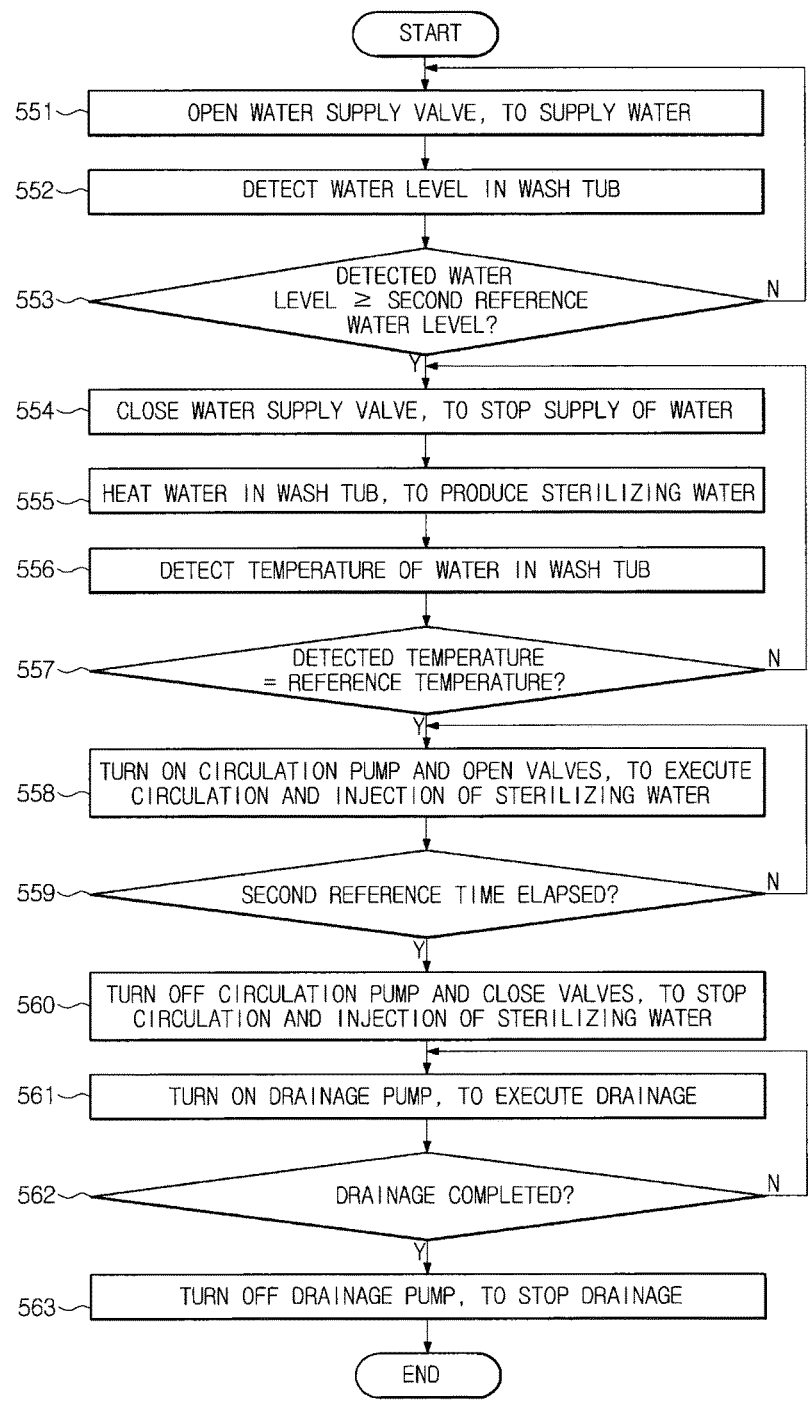
FIG. 10 is a flowchart illustrating a main sterilization operation of the sterilization mode in the embodiment of FIG. 6.
Figure 11:
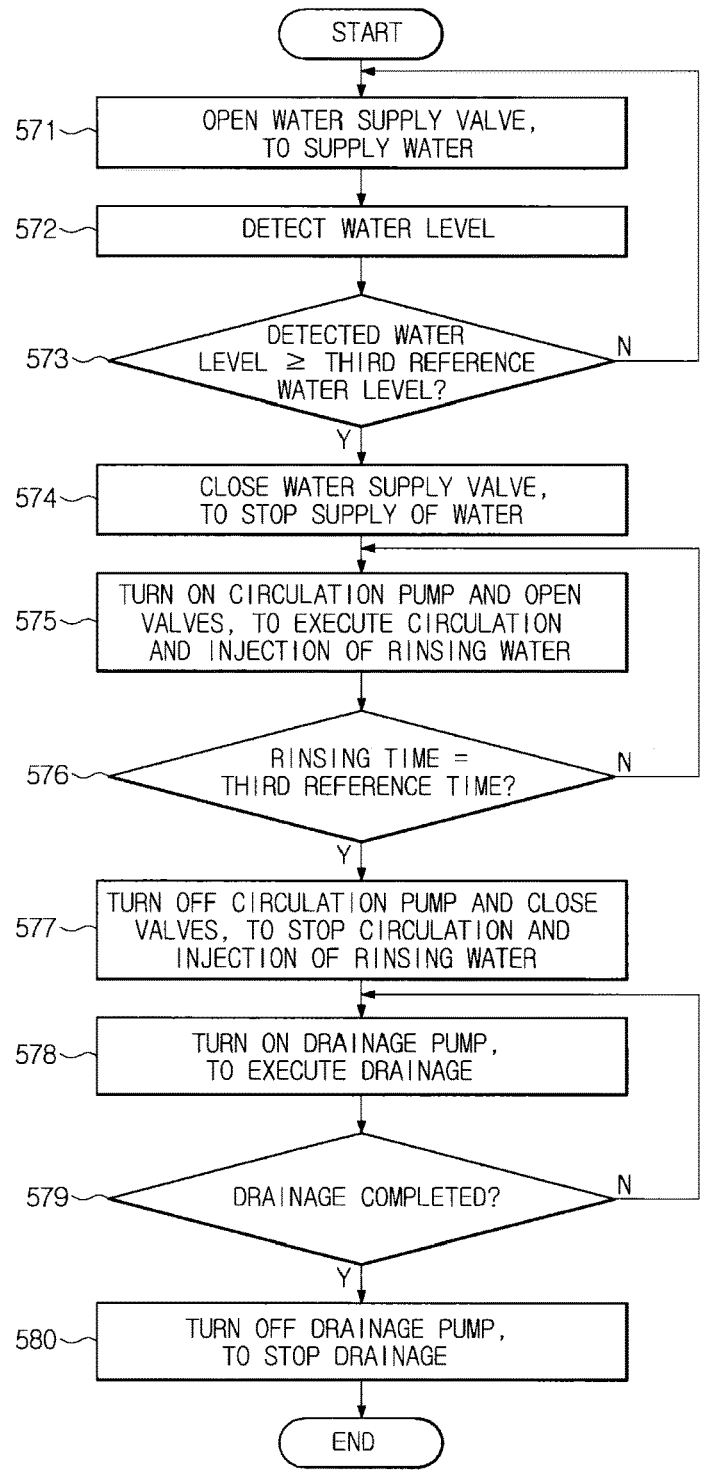
FIG. 11 is a flowchart illustrating a rinsing operation of the sterilization mode in the embodiment of FIG. 6.

The above-described preliminary sterilization operation, main sterilization operation and rinsing operation will be described in detail with reference to FIGS. 9 to 11.

The preliminary sterilization operation will be described with reference to FIG. 9.

Figure 9:
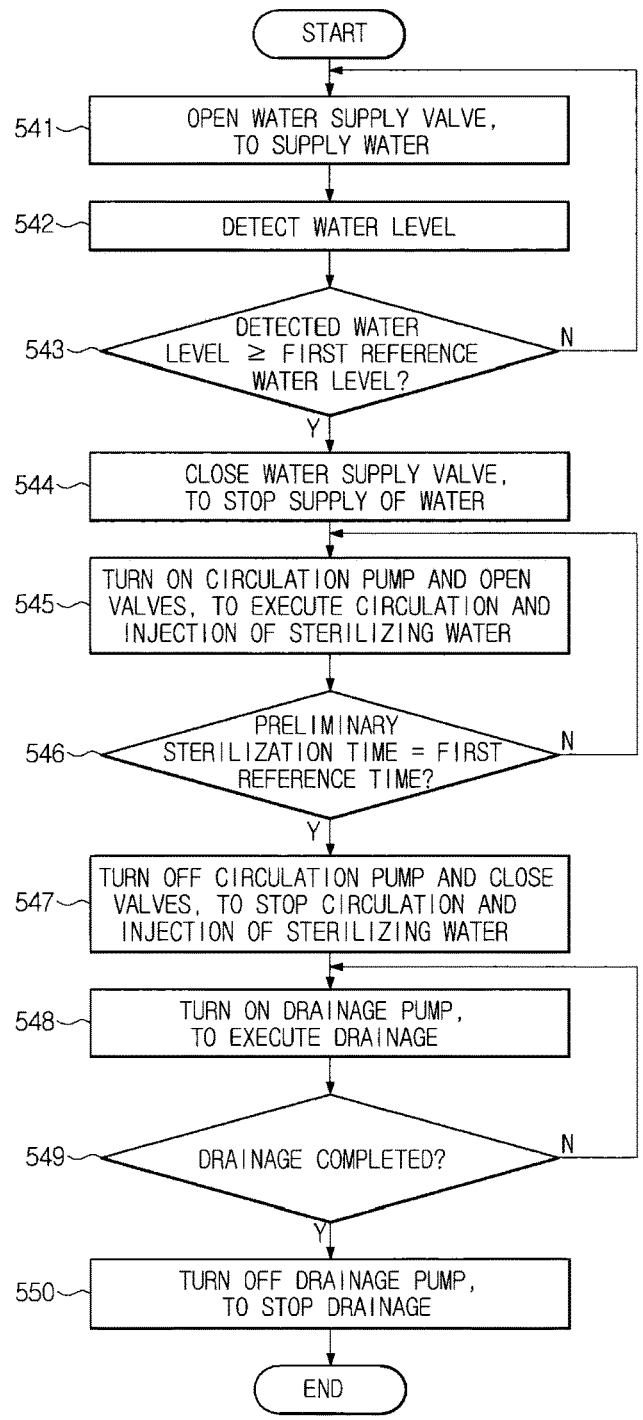
FIG. 9 is a flowchart illustrating a preliminary sterilization operation of the sterilization mode in the embodiment of FIG. 6.

As shown in FIG. 9, the dishwasher 2 opens the water supply valve 212 of the water supplier 210, to supply water from an external water supply source to the water collector 220 and wash tub 130 (541).

Thereafter, the dishwasher 2 detects the level of water supplied to the wash tub 130 (542), and compares the detected water level with a first reference water level, to determine whether the detected water level is equal to the first reference water level (543).

When it is determined that the detected water level is equal to the first reference water level, the dishwasher 2 closes the water supply valve 212, to stop supply of water (544).

Subsequently, the dishwasher 2 turns on the circulation pump 251, and opens the first valve 256, second valve 257 and third valve 258, to cause sterilizing water in the wash tub 130 and water collector 220 to flow to the first injection nozzle 261, second injection nozzle 262 and third injection nozzle 263 via the main tube 252, first branch tube 253, second branch tube 254 and third branch tube 255, and then to be injected into the wash chamber through the first injection nozzle 261, second injection nozzle 262 and third injection nozzle 263 (545).

That is, the dishwasher 2 executes sterilization for the interiors of the wash tub 130 and wash assembly 200 through circulation of sterilizing water carried out by injecting sterilizing water in the wash tub 130 and water collector 220 into the wash chamber in the wash tub 130 via the circulation pump 251, main tube 252, first branch tube 253, second branch tube 254, third branch tube 255, first injection nozzle 261, second injection nozzle 262 and third injection nozzle 263, and collecting the injected sterilizing water into the wash tub 130 and water collector 220.

Thereafter, the dishwasher 2 compares the preliminary sterilization time, for which the preliminary sterilization operation has been executed, with a first reference time, and determines whether the preliminary sterilization time corresponds to the first reference time (546). When it is determined that the preliminary sterilization time corresponds to the first reference time, the dishwasher 2 turns off the circulation pump 251, and closes the first valve 256, second valve 257 and third valve 258, to stop circulation and injection of the sterilizing water (547).

The dishwasher 2 then turns on the drainage pump 271, to outwardly drain sterilizing water from the wash tub 130 (548).

When it is determined that sterilizing water has been completely drained from the wash tub 130 (549), the dishwasher 2 turns off the drainage pump 271, to stop drainage of sterilizing water (550). Thus, the preliminary sterilization operation is completed.

Through execution of the above-described preliminary sterilization operation, it may be possible to primarily separate organic substances and microorganisms exhibiting low bonding force to the wash tub 130 before the main sterilization operation.

It may also be possible to reduce the concentration of organic substances in the wash tub 130 and wash assembly 200 before the main sterilization operation, and thus to achieve an enhancement in sterilization performance in the main sterilization operation.

The main sterilization operation will be described with reference to FIG. 10.

When the dishwasher 2 enters the sterilization mode, it opens the water supply valve 212 of the water supplier 210, to supply water from the external water supply source to the water collector 220 and wash tub 130 (551).

Thereafter, the dishwasher 2 detects the level of water supplied to the wash tub 130 (552), and compares the detected water level with a second reference water level, to determine whether the detected water level is equal to the second reference water level (553).

When it is determined that the detected water level is equal to the second reference water level, the dishwasher 2 closes the water supply valve 212, to stop supply of water (554). In this case, the dishwasher 2 turns on the heater 520, to heat water in the wash tub 130, and thus to produce sterilizing water (555).

In this case, the dishwasher 2 detects the temperature of the heated water, using the temperature detector 513 (556).

Thereafter, the dishwasher 2 compares the temperature of water in the wash tub 130 with a predetermined reference temperature (557). When the water temperature is equal to the reference temperature, the dishwasher 2 determines that production of sterilizing water has been completed, and turns off the heater 520, to stop heating.

Here, the sterilizing water is water having a temperature of 50 to 90° C.

Completion of production of sterilizing water may be determined on the basis of a predetermined heating time, without execution of a water temperature detection process.

Subsequently, the dishwasher 2 turns on the circulation pump 251, and opens the first valve 256, second valve 257 and third valve 258, to cause sterilizing water in the wash tub 130 and water collector 220 to flow to the first injection nozzle 261, second injection nozzle 262 and third injection nozzle 263 via the main tube 252, first branch tube 253, second branch tube 254 and third branch tube 255, and then to be injected into the wash chamber through the first injection nozzle 261, second injection nozzle 262 and third injection nozzle 263 (558).

That is, the dishwasher 2 executes sterilization for the interiors of the wash tub 130 and wash assembly 200 through circulation of sterilizing water carried out by injecting sterilizing water in the wash tub 130 and water collector 220 into the wash chamber in the wash tub 130 via the circulation pump 251, main tube 252, first branch tube 253, second branch tube 254, third branch tube 255, first injection nozzle 261, second injection nozzle 262 and third injection nozzle 263, and collecting the injected sterilizing water into the wash tub 130 and water collector 220.

Thereafter, the dishwasher 2 compares the sterilization time, for which the main sterilization operation has been executed, with a second reference time, and determines whether the sterilization time corresponds to the second reference time (559). When it is determined that the sterilization time corresponds to the second reference time, the dishwasher 2 turns off the circulation pump 251, and closes the first valve 256, second valve 257 and third valve 258, to stop circulation and injection of the sterilizing water (560).

In this case, the reference time is 15 minutes or more.

The dishwasher 2 then turns on the drainage pump 271, to outwardly drain sterilizing water from the wash tub 130 (561).

When it is determined that sterilizing water has been completely drained from the wash tub 130 (562), the dishwasher 2 turns off the drainage pump 271, to stop drainage of sterilizing water (563). Thus, the main sterilization operation is completed.

The main sterilization operation may be executed at least one time.

Also, determination of completion of drainage includes determination on the basis of the water level detected by the water level detector 512 or determination on the basis of a predetermined drainage time.

The rinsing operation will be described with reference to FIG. 11.

The dishwasher 2 opens the water supply valve 212 of the water supplier 210, to supply water from the external water supply source to the water collector 220 and wash tub 130 for a rinsing operation (571).

Thereafter, the dishwasher 2 detects the level of water supplied to the wash tub 130 (572), and compares the detected water level with a third reference water level, to determine whether the detected water level is equal to the third reference water level (573).

When it is determined that the detected water level is equal to the third reference water level, the dishwasher 2 closes the water supply valve 212, to stop supply of water (574).

Subsequently, the dishwasher 2 turns on the circulation pump 251, and opens the first valve 256, second valve 257 and third valve 258, to cause sterilizing water in the wash tub 130 and water collector 220 to flow to the first injection nozzle 261, second injection nozzle 262 and third injection nozzle 263 via the main tube 252, first branch tube 253, second branch tube 254 and third branch tube 255, and then to be injected into the wash chamber through the first injection nozzle 261, second injection nozzle 262 and third injection nozzle 263 (575).

Rinsing the interiors of the wash tub 130 and wash assembly 200 is executed through circulation of rinsing water carried out by injecting the rinsing water from the wash assembly 200 into the wash chamber in the wash tub 130, and then collecting the injected rinsing water into the wash tub 130 and water collector 220.

Thereafter, the dishwasher 2 compares the rinsing time, for which the rinsing operation has been executed, with a third reference time, and determines whether the rinsing time corresponds to the third reference time (576). When it is determined that the rinsing time corresponds to the third reference time, the dishwasher 2 turns off the circulation pump 251, and closes the first valve 256, second valve 257 and third valve 258, to stop circulation and injection of the rinsing water (577).

The dishwasher 2 then turns on the drainage pump 271, to outwardly drain rinsing water from the wash tub 130 (578).

When it is determined that rinsing water has been completely drained from the wash tub 130 (579), the dishwasher 2 turns off the drainage pump 271, to stop drainage of sterilizing water (580). Thus, the rinsing operation is completed. In this case, the rinsing water is room temperature water.

The dishwasher 2 may inform the user of information as to completion of the sterilization mode. Also, the dishwasher 2 may inform the user of execution schedule information of a next sterilization mode.

Through execution of the above-described sterilization mode, it may be possible to reduce the amounts of bacteria and organic substances in the dishwasher, and thus to reduce emission of offensive odor caused by decomposition. This will be described with reference to FIG. 12.

Figure 12:
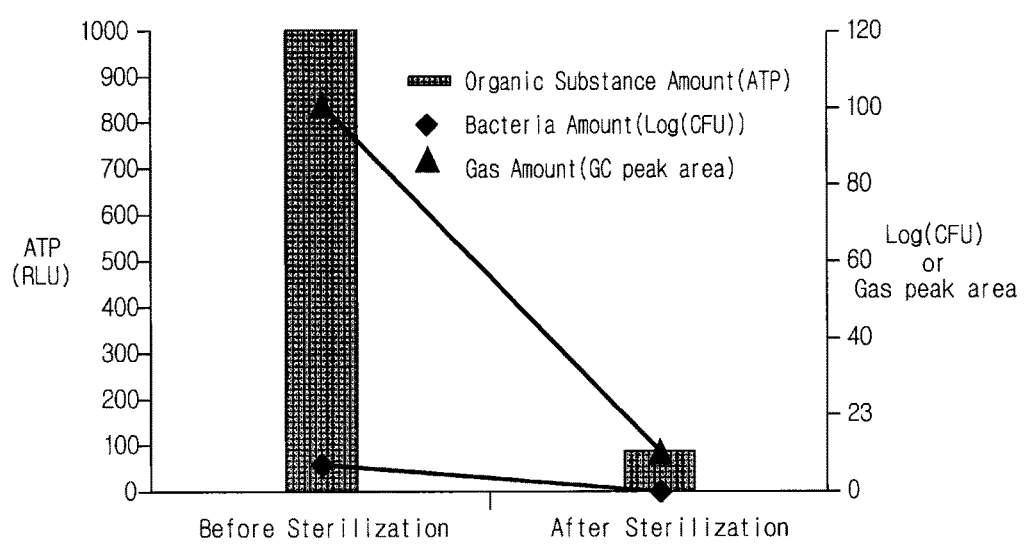
FIG. 12 shows graphs depicting amounts of bacteria, amounts of organic substances and amounts of emitted gas before and after execution of the sterilization mode in the dishwasher.

Referring to FIG. 12, after comparison of factors detected before and after execution of the sterilization mode in terms of the amount of bacteria, the amount of detected organic substances (ATP), and the amount of emitted offensive odor, it may be seen that sterilizing power is exhibited in that the amount of bacteria before execution of the sterilization mode is 7 Log/cm$^2$, whereas the amount of bacteria after execution of the sterilization mode is 6 Log/cm$^2$. It may also be seen that the amount of organic substances is reduced to 200RLU or less after execution of the sterilization mode.

It may also be seen that, in accordance with reductions in amount of bacteria and amount of organic substances, the amount of emitted gas is reduced by 90% after execution of the sterilization mode, as compared to the amount of emitted gas before execution of the sterilization mode.

Figure 13:
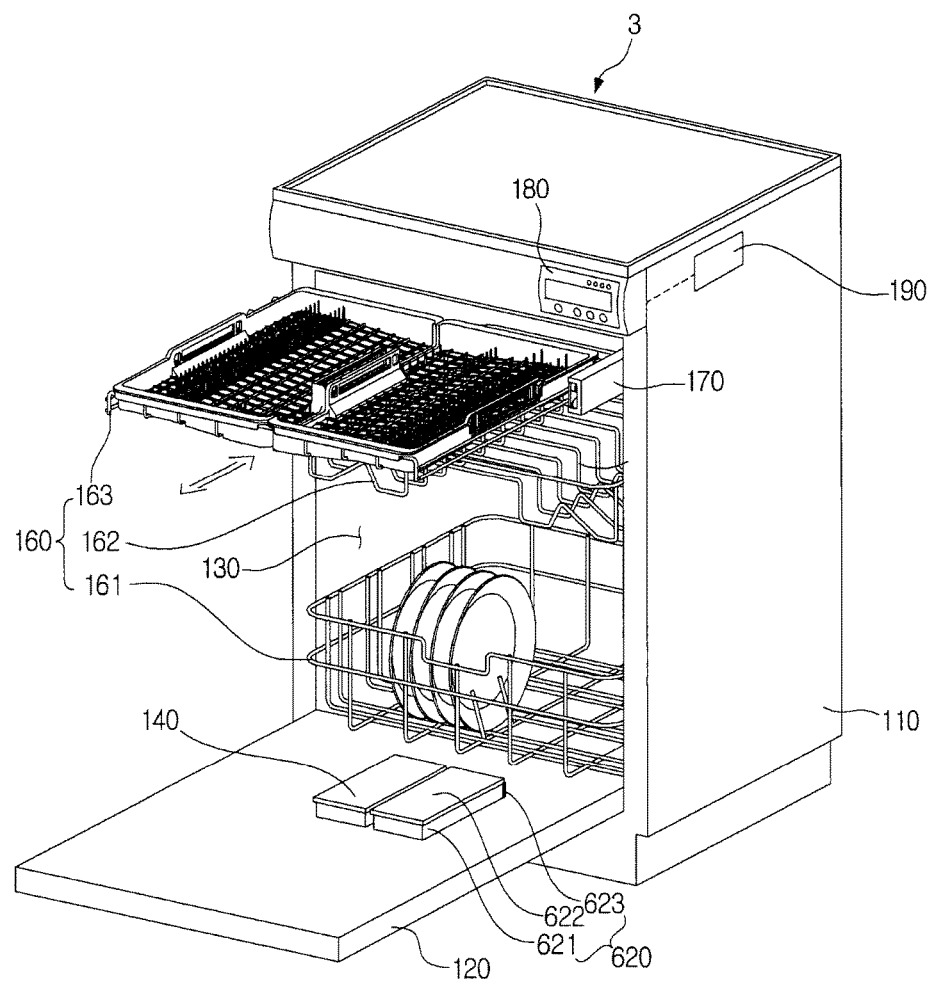
FIG. 13 is a perspective view of a dishwasher according to another embodiment of the present disclosure.
Figure 14:
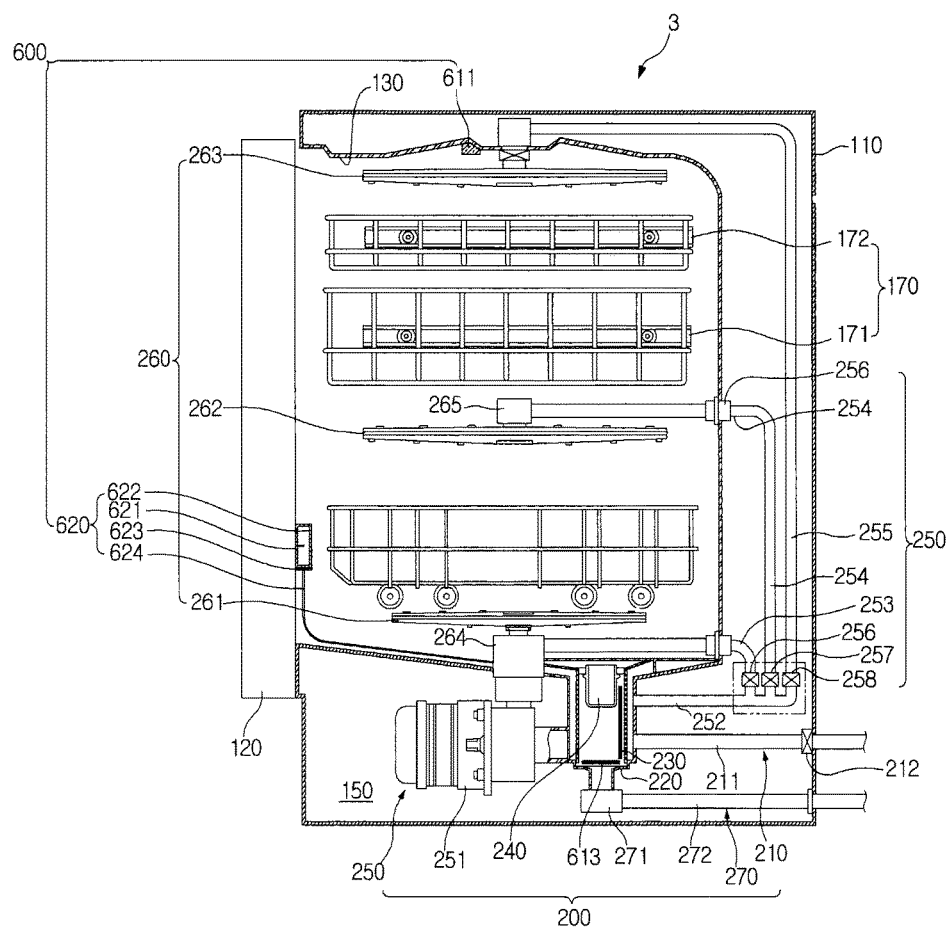
FIG. 14 is a sectional view illustrating an inner configuration of the dishwasher according to the embodiment of FIG. 13.

FIG. 13 is a perspective view of a dishwasher according to another embodiment of the present disclosure. FIG. 14 is a sectional view illustrating an inner configuration of the dishwasher according to the embodiment of FIG. 13. Referring to FIGS. 13 and 14, the dishwasher, which is designated by reference numeral "3", includes a body 110, a door 120, a wash tub 130, a detergent storage unit 140, a machinery chamber 150, a receiver 160, a guide 170, a user interface 180, a drive module 190, a wash assembly 200, and a sterilizer 600.

The body 110, door 120, wash tub 130, detergent storage unit 140, machinery chamber 150, receiver 160, guide 170, user interface 180 and wash assembly 200 in the dishwasher 3 according to the embodiment of FIG. 13 are identical to those in the dishwasher 2 according to the embodiment of FIG. 4 and, as such, no description thereof will be given.

As in the embodiment of FIG. 1, the wash assembly 200 may include a heater 230 to heat water for washing of dishes, and a temperature detector (not shown) to detect the temperature of water for washing of dishes.

The sterilizer 600 in the dishwasher 3 includes a detector 610 and a sterilizing agent storage unit 620.

The detector 610 detects the environment of the interior of the wash tub 130, for execution of the sterilization mode.

The detector 610 includes a dish detector 611 to detect whether there are dishes in the wash tub 130, a water level detector 612 disposed in the wash tub 130, to detect the level of water in the wash tub 130, and a sterilizing agent detector 613 to detect the amount of a sterilizing agent diluted in water in the water collector 220.

The sterilizing agent detector 613 may be disposed on an inner surface of the wash tub 130 at a lower level than the third reference level of rising water.

The sterilizing agent detector 613 is a turbidity sensor to detect the turbidity of rinsing water, an electric conductivity sensor to detect the electric conductivity of rising water, or a pH sensor to detect the pH of rinsing water.

The sterilizing agent storage unit 620 is disposed at an inner surface of the door 120, to store a sterilizing agent to sterilize the interiors of the wash tub 130 and wash assembly 200.

The sterilizing agent storage unit 620 includes a body 621 having a storage space to store a sterilizing agent, a cover 622 to open or close the storage space of the body 621 in order to allow the user to pour a sterilizing agent into the storage space, and an opening/closing member 623 to close the body 621 when the sterilization mode is not executed, but to automatically open the body 621 when the sterilization mode is executed, so as to discharge the sterilizing agent stored in the body 621.

The sterilizing agent storage unit 620 may further include a guide tube 624 to guide the sterilizing agent in the body 621 to the water collector 220.

The sterilizing agent stored in the sterilizing agent storage unit 620 includes a chlorine-based sterilizing agent and an oxygen-based sterilizing agent.

As the chlorine-based sterilizing agent, there are hypochlorite (sodium hypochlorite) and chlorine dioxide, which are inorganic chlorine compounds, and sodium dichloroisocyanurate (SDIC), which is an organic chlorine compound. As the oxygen-based sterilizing agent, there are hydrogen peroxide and ozone water.

Also, the sterilizing agent may include ozone water, electrolyzed sterilizing water, and radical water.

The sterilizing agent is discharged from the sterilizing agent storage unit 620, and is then dissolved in water in the water collector 220.

Figure 15:
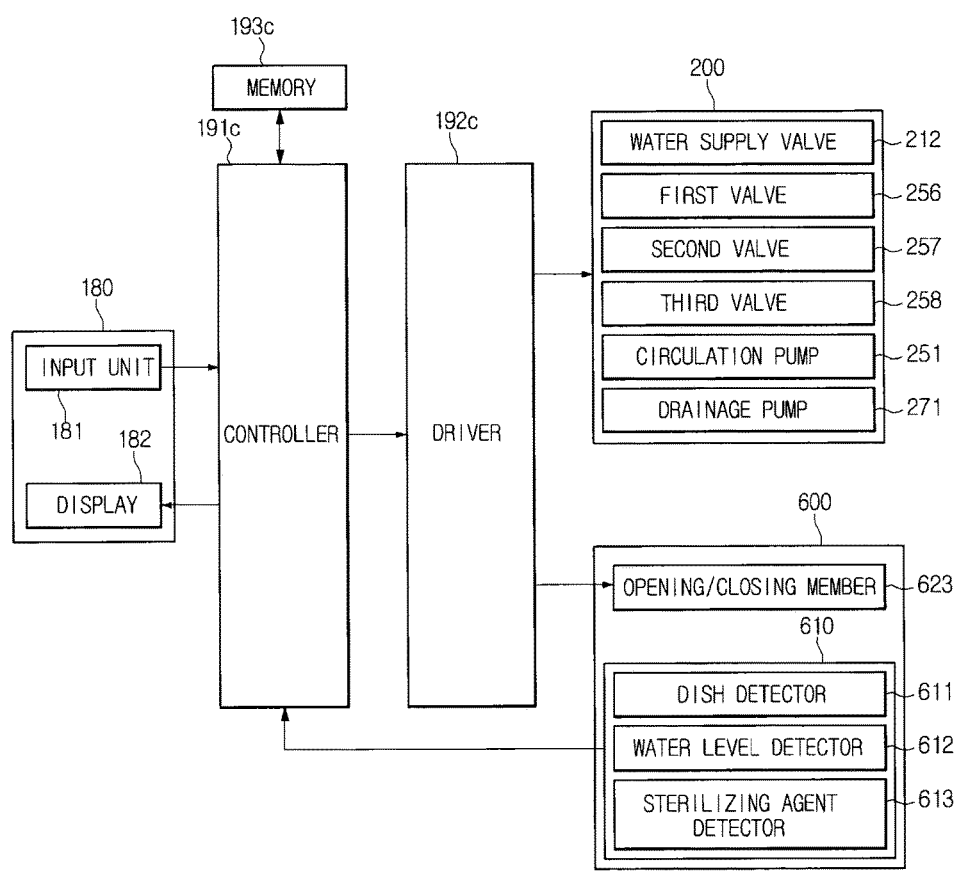
FIG. 15 is a block diagram illustrating a control configuration of the dishwasher according to another exemplary embodiment of the present disclosure.

FIG. 15 is a block diagram illustrating a control configuration of the dishwasher 3 according to another exemplary embodiment of the present disclosure. The dishwasher 3 includes the user interface 180, drive module 190, wash assembly 200, and sterilizer 600.

The user interface 180 includes an input unit 181 to receive operation information input by the user, and a display 182 to display information as to an operation in progress.

The input unit 181 of the user interface 180 also receives information as to a sterilization mode and a sterilization mode execution interval. In this case, the display 182 displays information associated with execution of the sterilization mode.

The sterilization mode includes a preliminary sterilization operation to preliminarily sterilize the wash tub 130, using room temperature water, a main sterilization operation to mainly sterilize the wash tub 130, using sterilizing water, in which the sterilizing agent is diluted, and a rinsing operation to remove the sterilizing agent left in the wash tub 130 and wash assembly 200.

The information associated with execution of the sterilization mode includes a sterilization mode execution elapsed time, a residual sterilization mode execution time, residual operation information, execution schedule information of a next sterilization mode, etc. The residual operation information includes information as to the execution time of the rinsing operation to remove the sterilizing agent left in the wash tub 130 or the number of times to execute the rinsing operation.

The user interface 180 may also display whether or not there is a sterilizing agent stored in the sterilizing agent storage unit 620, upon execution of the sterilization mode.

The wash assembly 200 drives the water supplier 210, circulator 250, and drainer 270 in a wash mode in accordance with a control command from a controller 191c, for collection, circulation, injection and drainage of wash water.

In the sterilization mode, the wash assembly 200 circulates sterilizing water and rinsing water. In this case, the interiors of the wash tub 130 and wash assembly 200 are washed and sterilized by the sterilizing water circulating through the wash assembly 200. Subsequently, the sterilizing water is removed from the interiors of the wash tub 130 and wash assembly 200 by the rinsing water circulating through the wash assembly 200.

The sterilizer 600 drives the detector 610 and the opening/closing member 623 of the sterilizing agent storage unit 620 in the main sterilization operation of the sterilization mode in accordance with a control command from the controller 191c, to produce sterilizing water for sterilization.

In this case, the detector 610 detects the environment of the interior of the wash tub 130, for execution of the sterilization mode.

The dish detector 611 detects whether there are dishes in the receiver 160 disposed in the wash tub 130, and transmits information as to the results of the detection to the controller 191c. The dish detector 611 includes one of a weight sensor, an acoustic sensor, a radio wave sensor, and an optical sensor.

The water level detector 612 detects an amount of water in the wash tub 130 or water collector 220, and transmits information as to the results of the detection to the controller 191c.

The sterilizing agent detector 613 detects the amount of the sterilizing agent left in water in the wash tub 130, and transmits information as to the results of the detection to the controller 191c.

As the water level detector 612, the water level detector employed for washing of dishes may be used, or a separate detector provided for sterilization of the interior of the wash tub 130 may be used.

The drive module 190 controls and drives various loads for execution of the wash mode and sterilization mode. The drive module 190 includes, in addition to the controller 191c, a driver 192c and a memory 193c.

The controller 191c receives operation information for washing of dishes and operation information for sterilization of the interior of the wash tub 130 via the user interface 180. The controller 191c controls display of the received operation information and information as to an operation in progress.

When the operation information input to the user interface 180 represents the wash mode, the controller 191c controls the detergent storage unit 140 to be opened for discharge of the detergent. The controller 191c also controls driving of the wash assembly 200, for execution of a wash operation, a rinsing operation and a drying operation.

When the controller 191c determines that the operation information input through the user interface 180 represents the sterilization mode or the current point of time is a time when the sterilization mode is to be executed, the controller 191c determines whether there are dishes in the wash tub 130. When it is determined that there are no dishes in the wash tub 130, the controller 191c controls driving of the water supply valve 212 of the water supplier 210 and the opening/closing member 623 of the sterilizing agent storage unit 620, based on information detected by the water level detector 612, for production of sterilizing water for the sterilization operation.

When production of sterilizing water through addition of the sterilizing agent during the main sterilization operation is completed, the controller 191c performs a control operation to turn on the circulation pump 251 of the circulator 250 and to open the valves 256, 257 and 258, for injection of the produced sterilizing water. After completion of the sterilization operation, the controller 191c performs a control operation to turn on the drainage pump 271 of the drainer 270, for outward drainage of the sterilizing water.

The controller 191c controls execution of the sterilization mode such that the rinsing operation is executed at least one time for discharge of the sterilizing agent from the wash tub 130.

In this case, the controller 191c repeatedly controls the rinsing operation until the amount of the sterilizing agent left in the wash tub 130 is equal to or less than a reference amount.

For control of the rinsing operation, the controller 191c may repeatedly control driving of the water supplier 210 and circulator 250 a number of times corresponding to a predetermined number of times that the rinsing operation is repeatedly executed.

In the wash mode, the driver 192c drives the water supply valve 211 of the water supplier 210 and the circulation pump 251, first valve 256, second valve 257 and third valve 258 of the circulator 250 in accordance with a control signal from the controller 191c, for circulation of wash water to wash dishes. The driver 192c also drives the drainage pump 271 of the drainer 270 in accordance with a control signal from the controller 191c, for outward drainage of water used to wash dishes.

In the main sterilization operation of the sterilization mode, the driver 192c drives the water supplier 210 and sterilizing agent storage unit 620 in accordance with a control signal from the controller 191c, for production of sterilizing water.

In the sterilization mode, the driver 192c drives the water supply valve 211 of the water supplier 210 and the circulation pump 251, first valve 256, second valve 257 and third valve 258 of the circulator 250 for circulation of the sterilizing water, and drives the drainage pump 271 of the drainer 270 for outward drainage of the sterilizing water.

The memory 193c stores a predetermined sterilization interval, a first reference water level and a first reference time, which are suitable for the preliminary sterilization operation to sterilize the wash tub 130 and wash assembly 200, a second reference water level and a second reference time, which are suitable for the main sterilization operation, and a third reference water level and a third reference time, which are suitable for the rinsing operation to rinse the sterilized wash tub 130 and wash assembly 200.

The memory 193c may also store a reference sterilizing agent amount for stop of the rinsing operation, and a reference turbidity for stop of the preliminary sterilization operation.

Figure 16A:
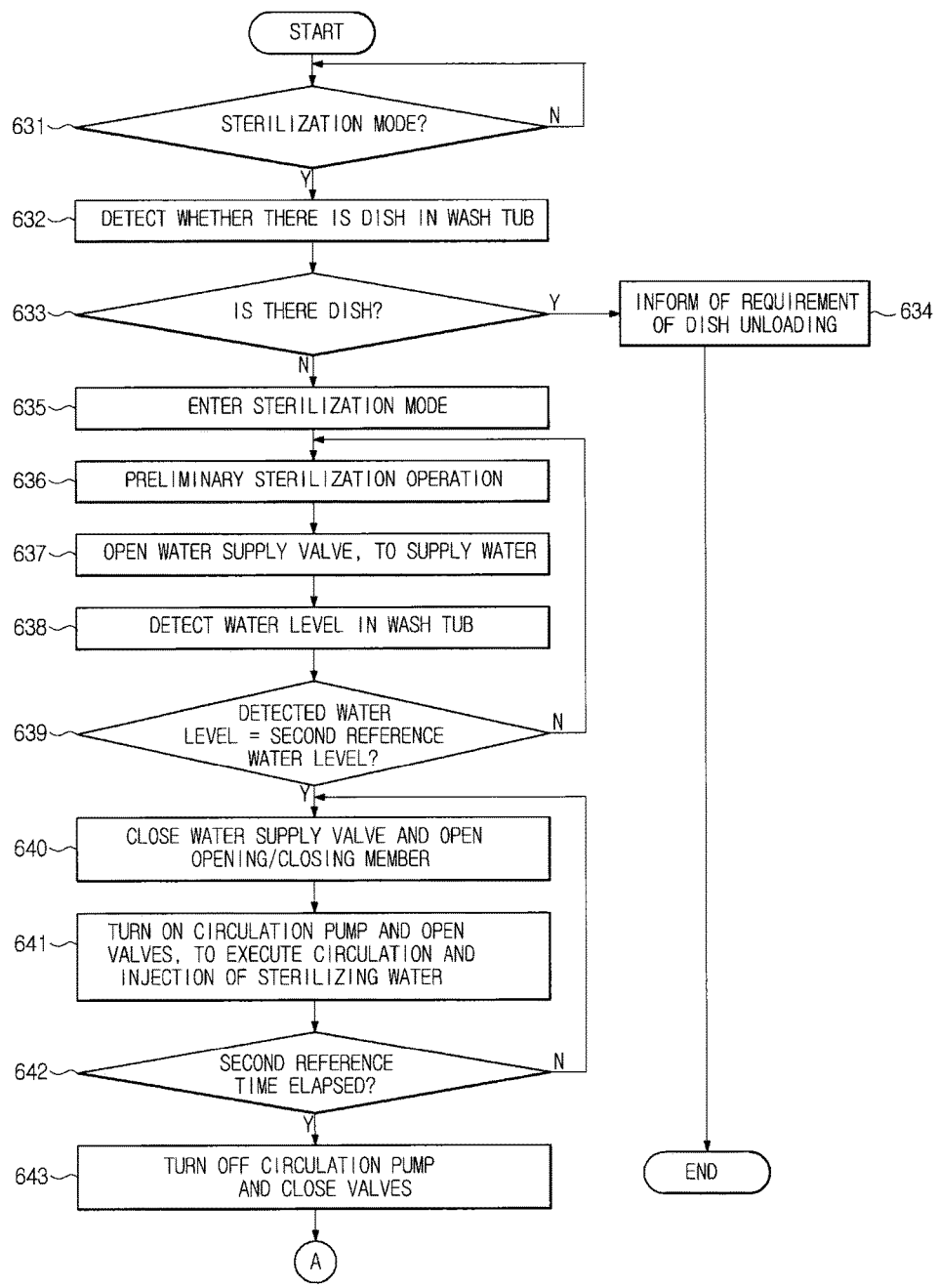
FIGS. 16A and 16B are flowcharts illustrating a control operation of the dishwasher according to the embodiment of FIG. 15.
Figure 16B:
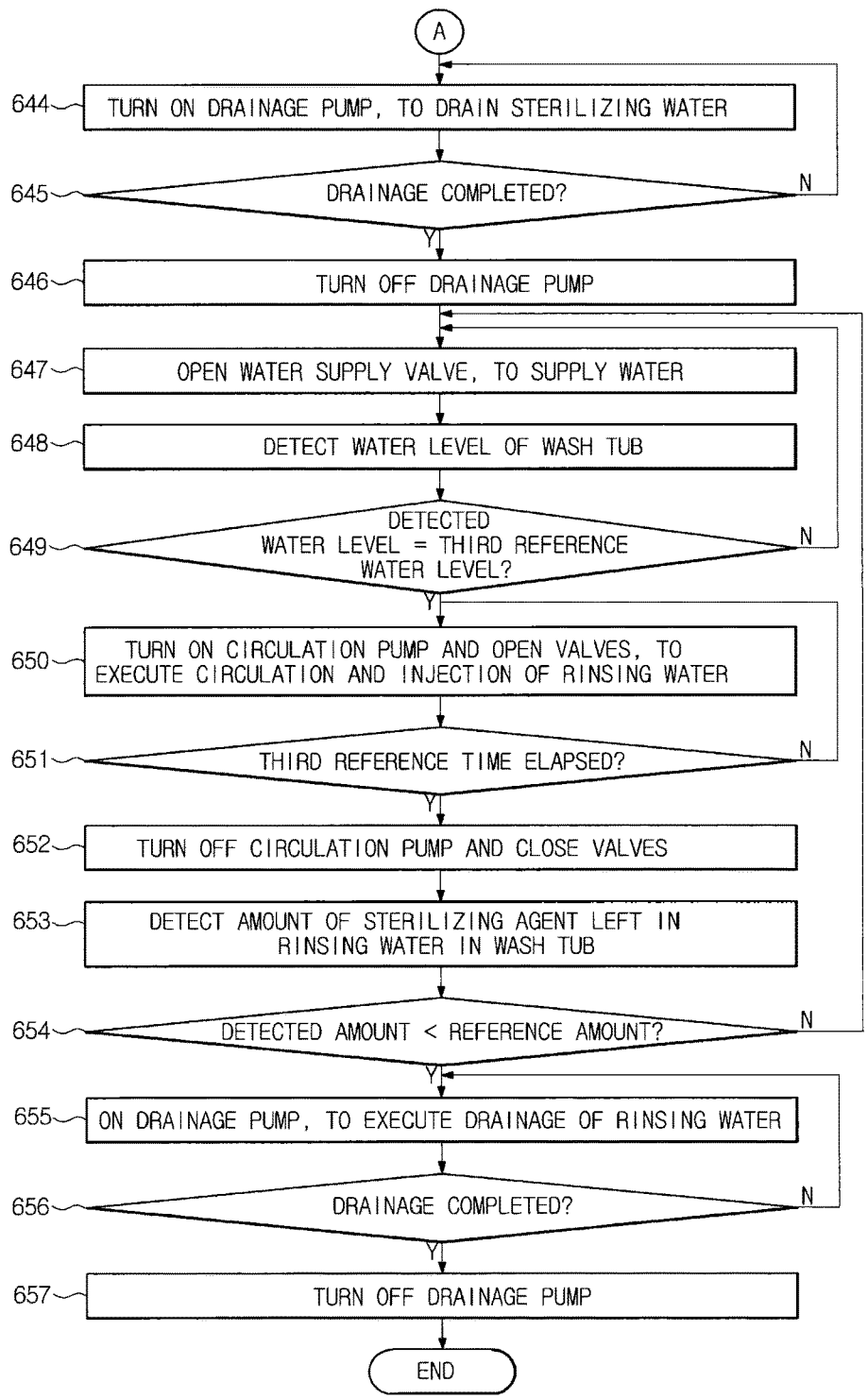

FIGS. 16A and 16B are flowcharts illustrating a control operation of the dishwasher according to the embodiment of FIG. 15.

The dishwasher 3 determines whether the sterilization mode is to be executed (631).

Determination of execution of the sterilization mode includes determination of whether a command for execution of the sterilization mode has been input to the user interface 180, determination of whether the current point of time is a time when the sterilization mode is to be executed in accordance with a predetermined sterilization mode execution interval, or determination of whether the amount of offensive odor detected by an odor detector (not shown) is equal to or more than a reference amount.

The odor detector includes a gas sensor to detect the amount of gas in the wash tub 130.

Thereafter, the dishwasher 2 executes detection of a dish in the wash chamber, using the dish detector 611 (632), and determines whether there are dishes in the wash chamber, based on detection information from the dish detector 611 (633). When it is determined that there are dishes in the wash chamber, the dishwasher 3 informs the user of requirement of dish unloading (634). After dish unloading, the dishwasher 2 again informs the user of input of the sterilization mode execution command.

The reason why it is determined whether there are dishes in the wash chamber is to execute the sterilization mode in a state in which there is no factor interfering with execution of sterilization of the interior of the wash tub 130, namely, there are no dishes in the wash chamber. Under this condition, it may be possible to achieve an enhancement in sterilizing performance.

Also, it may be possible to prevent the sterilizing agent, which is harmful to the human body, from being left on dishes, and thus to achieve an enhancement in safety.

On the other hand, when it is determined that there are no dishes in the wash chamber, the dishwasher 3 enters the sterilization mode for sterilization of the wash tub 130 and wash assembly 200 (635). The dishwasher 3 then sequentially executes the preliminary sterilization operation (636). In this case, the preliminary sterilization operation may be executed a predetermined number of times or for a predetermined time.

Alternatively, the preliminary sterilization operation may be selectively executed.

The preliminary sterilization operation 636 will be described in brief because it is identical to that of the previous embodiments.

The dishwasher 3 opens the water supply valve 212 of the water supplier 210, to supply water from an external water supply source to the water collector 220 and wash tub 130. Thereafter, the dishwasher 3 detects the level of water supplied to the wash tub 130, and compares the detected water level with a first reference water level, to determine whether the detected water level is equal to the first reference water level.

When it is determined that the detected water level is equal to the first reference water level, the dishwasher 3 closes the water supply valve 212, to stop supply of water.

Subsequently, the dishwasher 3 turns on the circulation pump 251, and opens the first valve 256, second valve 257 and third valve 258, to cause sterilizing water in the wash tub 130 and water collector 220 to flow to the first injection nozzle 261, second injection nozzle 262 and third injection nozzle 263 via the main tube 252, first branch tube 253, second branch tube 254 and third branch tube 255, and then to be injected into the wash chamber through the first injection nozzle 261, second injection nozzle 262 and third injection nozzle 263.

Thereafter, the dishwasher 3 compares the preliminary sterilization time, for which the preliminary sterilization operation has been executed, with a first reference time, and determines whether the preliminary sterilization time corresponds to the first reference time. When it is determined that the preliminary sterilization time corresponds to the first reference time, the dishwasher 3 turns off the circulation pump 251, and closes the first valve 256, second valve 257 and third valve 258, to stop circulation and injection of the sterilizing water. The dishwasher 3 then turns on the drainage pump 271, to outwardly drain sterilizing water from the wash tub 130.

Subsequently, when it is determined that sterilizing water has been completely drained from the wash tub 130, the dishwasher 3 turns off the drainage pump 271, to stop drainage of sterilizing water. Thus, the preliminary sterilization operation is completed.

Thereafter, the main sterilization operation is executed. The main sterilization operation will be described in detail.

When the dishwasher 3 enters the sterilization mode, it opens the water supply valve 212 of the water supplier 210, to supply water from the external water supply source to the water collector 220 and wash tub 130 (637).

Thereafter, the dishwasher 3 detects the level of water supplied to the wash tub 130 (638), and compares the detected water level with a second reference water level, to determine whether the detected water level is equal to the second reference water level (639).

When it is determined that the detected water level is equal to the second reference water level, the dishwasher 3 operates the water supply valve 212, to close the water supply valve 212 and thus to stop supply of water (640). In this case, the dishwasher 3 also operates the opening/closing member 623 of the sterilizing agent storage unit 620, to open the opening/closing member 623 and thus to discharge the sterilizing agent in the body 621 of the sterilizing agent storage unit 620 into the wash tub 130.

In this case, the sterilizing agent discharged from the sterilizing agent storage unit 620 is diluted in water in the water collector 220.

After completion of discharge of the sterilizing agent, the dishwasher 3 closes the opening/closing member 623 of the sterilizing agent storage unit 620.

Subsequently, the dishwasher 3 turns on the circulation pump 251, and controls the first valve 256, second valve 257 and third valve 258, to be opened (641).

As a result, sterilizing water in the wash tub 130 and water collector 220 flows to the first injection nozzle 261, second injection nozzle 262 and third injection nozzle 263 via the main tube 252, first branch tube 253, second branch tube 254 and third branch tube 255, and then to be injected into the wash chamber through the first injection nozzle 261, second injection nozzle 262 and third injection nozzle 263.

That is, the dishwasher 3 executes wash and sterilization for the interiors of the wash tub 130 and wash assembly 200 through circulation of sterilizing water carried out by injecting sterilizing water in the wash tub 130 and water collector 220 into the wash chamber in the wash tub 130 via the circulation pump 251, main tube 252, first branch tube 253, second branch tube 254, third branch tube 255, first injection nozzle 261, second injection nozzle 262 and third injection nozzle 263, and collecting the injected sterilizing water into the wash tub 130 and water collector 220.

In this case, a chlorine or oxygen-based sterilizing agent is supplied and circulated by the circulation pump 251, to sterilize the whole interior of the wash tub 130.

Thereafter, the dishwasher 3 compares the sterilization time, for which the main sterilization operation has been executed, with a second reference time (642), and determines whether the sterilization time corresponds to the second reference time. When it is determined that the sterilization time corresponds to the second reference time, the dishwasher 3 turns off the circulation pump 251, and closes the first valve 256, second valve 257 and third valve 258, to close the circulation line of the sterilizing water and thus to stop circulation and injection of the sterilizing water (643).

In this case, the reference time is 15 minutes or more.

The dishwasher 3 then turns on the drainage pump 271, to outwardly drain sterilizing water from the wash tub 130 (644).

When it is determined that sterilizing water has been completely drained from the wash tub 130 (645), the dishwasher 3 turns off the drainage pump 271, to stop drainage of sterilizing water (646). Thus, the main sterilization operation is completed.

The main sterilization operation may be executed at least one time.

Also, determination of completion of drainage includes determination on the basis of the water level detected by the water level detector 612 or determination on the basis of a predetermined drainage time.

Thereafter, the dishwasher 3 executes the rinsing operation. Hereinafter, this will be described in detail.

The dishwasher 3 opens the water supply valve 212 of the water supplier 210, to supply water from the external water supply source to the water collector 220 and wash tub 130 for a rinsing operation (647).

Thereafter, the dishwasher 3 detects the level of water supplied to the wash tub 130 (648), and compares the detected water level with a third reference water level, to determine whether the detected water level is equal to the third reference water level (649).

When it is determined that the detected water level is equal to the third reference water level, the dishwasher 3 closes the water supply valve 212, to stop supply of water.

Subsequently, the dishwasher 3 turns on the circulation pump 251, and opens the first valve 256, second valve 257 and third valve 258, to open the circulation line, so as to cause sterilizing water in the wash tub 130 and water collector 220 to flow to the first injection nozzle 261, second injection nozzle 262 and third injection nozzle 263 via the main tube 252, first branch tube 253, second branch tube 254 and third branch tube 255, and then to be injected into the wash chamber through the first injection nozzle 261, second injection nozzle 262 and third injection nozzle 263 (650). In this case, the rinsing water is room temperature water.

Rinsing the interiors of the wash tub 130 and wash assembly 200 is executed through circulation of rinsing water carried out by injecting the rinsing water from the wash assembly 200 into the wash chamber in the wash tub 130, and then collecting the injected rinsing water into the wash tub 130 and water collector 220.

Thereafter, the dishwasher 3 compares the rinsing time, for which the rinsing operation has been executed, with a third reference time, and determines whether the rinsing time corresponds to the third reference time (651). When it is determined that the rinsing time corresponds to the third reference time, the dishwasher 3 turns off the circulation pump 251, and closes the first valve 256, second valve 257 and third valve 258, to stop circulation and injection of the rinsing water (652).

The dishwasher 3 subsequently detects the amount of the sterilizing agent left in the rinsing water (653). The dishwasher 3 then compares the detected amount with a reference amount (654). When the detected amount is equal to or more than the reference amount, the dishwasher 3 executes the rinsing operation. On the other hand, when the detected amount is less than the reference amount, the dishwasher 3 turns on the drainage pump 271, to outwardly drain the rinsing water from the wash tub 130 (655).

The reason why it is detected, during execution of the sterilization mode, whether the sterilizing agent is left in the wash tub 130 is to prevent the sterilizing agent, which is harmful to the human body, from coming into contact with dishes during execution of the wash mode.

When it is determined that sterilizing water has been completely drained from the wash tub 130 (656), the dishwasher 2 turns off the drainage pump 271, to stop drainage of sterilizing water (657). Thus, the rinsing operation is completed.

In this case, the rinsing operation may be executed a predetermined number of times. Alternatively, the rinsing operation may be executed for a predetermined time.

Thereafter, the dishwasher 3 may inform the user of information as to completion of the sterilization mode. Also, the dishwasher 3 may inform the user of execution schedule information of a next sterilization mode.

Through wash and sterilization of the wash tub and wash assembly using the sterilizing agent, as described, it may be possible to prevent propagation of microorganisms and thus to prevent generation of offensive odor. This will be described with reference to FIGS. 17 and 18.

Figure 17:
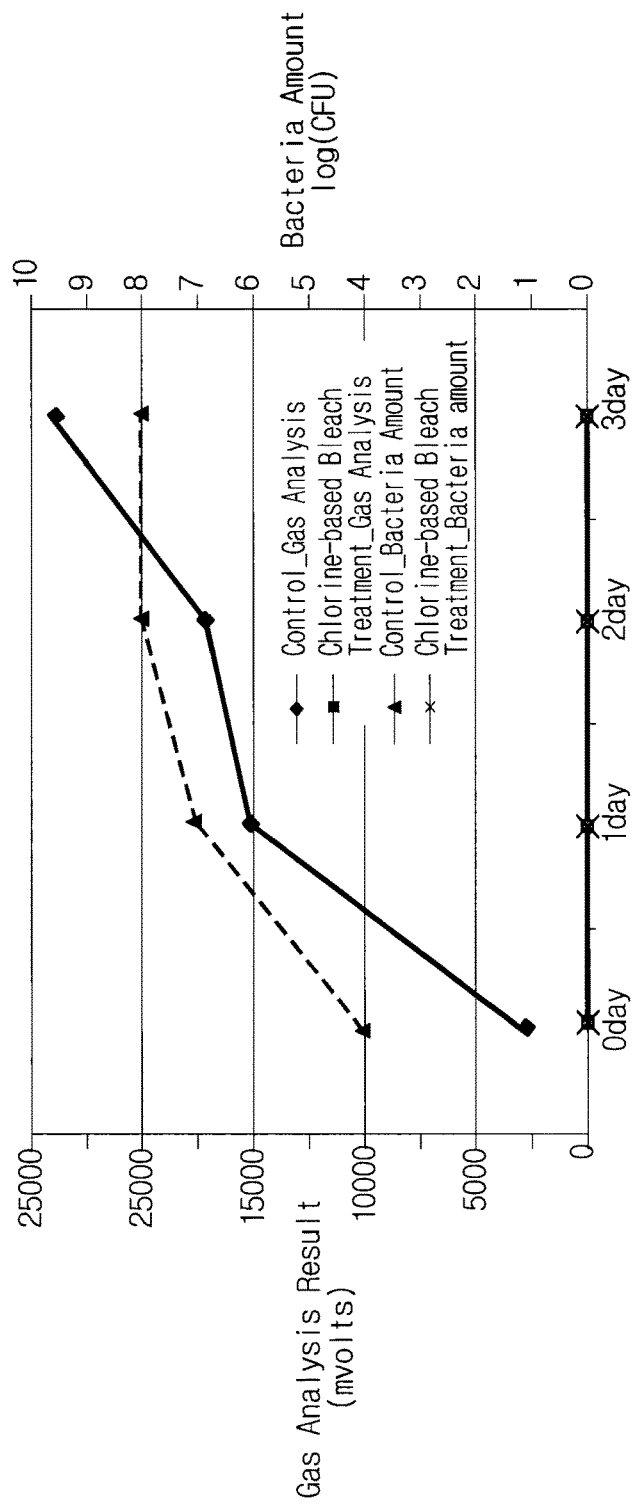
FIG. 17 shows graphs depicting amounts of bacteria and amounts of gas in the dishwasher before and after execution of the sterilization mode.
Figure 18:
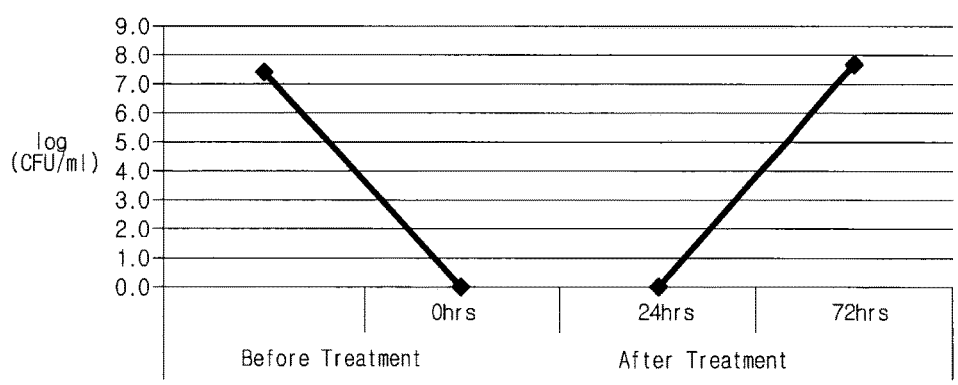
FIG. 18 shows a graph depicting a variation in amount of bacteria with the passage of time.

FIG. 17 shows graphs depicting amounts of bacteria and amounts of gas in the dishwasher before and after execution of the sterilization mode. FIG. 18 shows a graph depicting a variation in amount of bacteria with the passage of time.

Referring to FIG. 17, it may be seen that bacteria is typically present in an amount of 4 Log in water in the water collector after completion of the wash mode in the dishwasher, whereas the amount of bacteria is increased to 8 Log or more after 48 hours elapses and, as such, the amount of bacteria in the water collector reaches a saturation level.

Meanwhile, gas of amines, anilines, organic acids, thiols or the like is generated in decomposition of protein and vegetables in the dishwasher.

In order to compare an increase rate of bacteria amount and a generation rate of offensive odor, gas of thiols known as typical offensive odor ingredients is daily analyzed. Based on the results of the analysis, it may be seen that the generation rate of thiol gas is increased in accordance with an increased amount of bacteria.

On the other hand, it may be seen that, after completion of the sterilization mode in the dishwasher, there are bacteria and gas in water in the water collector in amounts approximating to zero.

Referring to FIG. 18, it may be seen that the amount of bacteria is reduced in the dishwasher after completion of the sterilization mode, and a bacteria amount of 0 Log is maintained for 24 hours after the sterilization mode.

In the dishwasher according to the embodiment of FIG. 13, the detergent storage unit and the sterilizing agent storage unit are separately provided. However, it may be possible to supply the sterilizing agent in the sterilization mode, only using the detergent storage unit, without using the sterilizing agent storage unit.

In this case, at a time when the sterilization mode is to be executed, the dishwasher informs the user of supply of the sterilizing agent, through the user interface. When a command to execute supply of the sterilizing agent and a command to execute the sterilization mode are input from the user, the dishwasher controls the detergent storage unit to discharge the sterilizing agent store therein into the wash tub, and then executes supply, circulation, injection, and drainage of water, to sterilize the wash tub and wash assembly.

As apparent from the above description, in accordance with one aspect of the present disclosure, a reservoir provided with an electrolyzer is connected to a water collector via a flow path change valve, and wash water in the reservoir is electrolyzed by the electrolyzer during non-operation of the wash water, to generate sterilizing water and to circulate the sterilizing water into the dishwasher. Accordingly, it may be possible to achieve an enhancement in sterilizability of the dishwasher.

In accordance with another aspect of the present disclosure, the wash water stored in the reservoir is sterilized by the electrolyzer during operation of the dishwasher, to be used as reserve wash water. Accordingly, it may be possible to increase the solubility of the detergent and to electrolyze the wash water.

In accordance with another aspect of the present disclosure, it may be possible to suppress propagation of microorganisms left in the dishwasher and to remove organic substances, using a sterilizing agent or high-temperature water.

It may also be possible to reduce generation of offensive odor caused by decomposition of bacteria, through a reduction in the amount of bacteria in the dishwasher.

Since sterilization of the dishwasher is automatically carried out, enhanced user convenience is provided. Also, it may be possible to prevent the sterilizing agent from being left on dishes before and after execution of a sterilization operation, and thus to safely use the dishwasher.

Through execution of the preliminary sterilization operation before the main sterilization operation in the sterilization mode of the dishwasher, it may be possible to primarily separate organic substances and microorganisms exhibiting low bonding force to the inner surface of the wash tub and to outwardly discharge the separated organic substances and microorganisms. Accordingly, it may be possible to achieve an enhancement in wash and sterilization performance in the main sterilization operation for organic substances and microorganisms, which are difficult to be washed and sterilized.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A dishwasher comprising:

a wash tub;

a wash assembly, in which water flows to wash dishes received in the wash tub;

a driver configured to drive the wash assembly;

a sterilizer to produce sterilizing water;

an input configured to receive a user input in association with a wash mode and a user input in association with a sterilization mode;

a controller configured to, when a command to execute the sterilization mode is received, determine whether there are dishes received in the wash tub, when it is determined that there are dishes in the wash tub, prevent the sterilization mode from being executed, and when it is determined that there are no dishes in the wash tub, control the sterilizer to produce sterilizing water in the sterilization mode, control the driver to drive the wash assembly in the sterilization mode, to cause the sterilizing water to circulate through an interior of the wash tub and an interior of the wash assembly, and when the user input in association with the washing of the dishes is received during the sterilization mode, prevent the washing mode from being executed; and a display configured to display information as to an operation in progress during an operation in the wash mode and information associated with execution of the sterilization mode.

2. The dishwasher according to claim 1, further comprising:

a dish detector to detect the dishes received in the wash tub, wherein when the dishes are detected, the display displays that dishes are received in the wash tub before preventing the executing of the sterilization mode.

3. The dishwasher according to claim 2, wherein:

the dish detector comprises a weight sensor to detect a weight of a receiver to receive dishes;

the controller determines that there are dishes in the wash tub, when the detected weight is equal to or greater than a reference weight.

4. The dishwasher according to claim 3, wherein:

the dish detector further comprises an optical sensor to output light and to detect an amount of the output light; and the controller determines that there are dishes in the wash tub, when the detected light amount is equal to or greater than a reference light amount.

5. The dishwasher according to claim 1, wherein the sterilizer comprises a heater to heat water in the wash tub.

6. The dishwasher according to claim 5, wherein:

the sterilizer further comprises a temperature detector to detect a temperature of the water in the wash tub; and the controller stops driving of the heater, based on the detected water temperature.

7. The dishwasher according to claim 6, wherein the sterilizing water is water of about 50 to 90°C.

8. The dishwasher according to claim 6, further comprising:
a water supplier;
a circulator;
an injector; and
a drainer,
wherein the sterilization mode comprises a preliminary sterilization operation, a main sterilization operation, and a rinsing operation, and
the controller controls the water supplier, the circulator, the injector and the drainer during the preliminary sterilization and rinsing operations, and controls the water supplier, the heater, the circulator, the injector and the drainer during the main sterilization operation.

9. The dishwasher according to claim 8, wherein the main sterilization operation is executed for about 15 minutes or more.

10. The dishwasher according to claim 8, further comprising:
a water level detector to detect a water level of the wash tub,
wherein the controller stops the water supplier, based on the detected water level.

11. The dishwasher according to claim 1, further comprising:
a memory to store an execution interval of the sterilization mode,
wherein the controller determines whether a current point of time is a time when the sterilization mode is to be executed, based on the stored sterilization mode execution interval, and controls execution of the sterilization mode when the current point of time is the time when the sterilization mode is to be executed.

12. The dishwasher according to claim 11, wherein the sterilization mode execution interval is about 30 days.

13. The dishwasher according to claim 11, wherein the display displays the sterilization mode execution interval.

14. The dishwasher according to claim 1, wherein the user input in association with the sterilization mode includes the command to execute the sterilization mode and information as to at least one of a preliminary sterilization operation to preliminarily sterilize the wash tub using water at a temperature lower than the sterilizing water, a main sterilization operation to mainly sterilize the wash tub using the sterilizing water, and a rinsing operation to remove the sterilizing water.

15. The dishwasher according to claim 1, wherein the sterilizer comprises a sterilizing agent storage unit to store a sterilizing agent and to discharge the sterilizing agent into the wash tub in the sterilization mode, and
wherein the sterilizing agent storage unit comprises
an opening/closing member to enable the discharge of the sterilizing agent in an opened state hereof; and
a guide tube to guide the sterilizing agent to the wash tub.

16. The dishwasher according to claim 15, wherein the controller controls the opening/closing member of the sterilizing agent storage unit to be opened in the sterilization mode.

17. The dishwasher according to claim 1, further comprising:
a water supplier;
a sterilizing agent storage;
a circulator;
an injector; and
a drainer,
wherein the sterilization mode comprises a preliminary sterilization operation, a main sterilization operation, and a rinsing operation; and
the controller controls the water supplier, the circulator, the injector and the drainer during the preliminary sterilization and rinsing operations, and controls the water supplier, the sterilizing agent storage, the circulator, the injector and the drainer during the main sterilization operation.

18. The dishwasher according to claim 17, further comprising:
a sterilizing agent detector to detect an amount of a sterilizing agent left in rinsing water used in the rinsing operation,
wherein the controller controls the rinsing operation to be repeatedly executed when the detected sterilizing agent amount is equal to or more than a reference amount, and stops the rinsing operation when the detected sterilizing agent amount is less than the reference amount.

19. The dishwasher according to claim 18, wherein the sterilizing agent detector comprises a turbidity sensor to detect a turbidity of the rinsing water, an electric conductivity sensor to detect an electric conductivity of the rising water, or a pH sensor to detect a pH of the rinsing water.

20. The dishwasher according to claim 17, further comprising:
a water level detector to detect a water level of the wash tub,
wherein the controller stops the water supplier, based on the detected water level.

21. The dishwasher according to claim 1, wherein the wash assembly comprises:
a water supplier to supply water from an external water supply source;
a water collector to store the supplied water;
a circulator to pump the water from the water collector, for circulation of the water;
an injector to inject the circulated water into the wash tub; and
a drainer to outwardly drain the water.

22. The dishwasher according to claim 21, wherein the sterilizer includes:
a reservoir to store a portion of the wash water;
an electrolyzer disposed in the reservoir;
a flow path change valve to open and close a flow passage between the water collector and the reservoir,
wherein the controller to control the electrolyzer to electrolyze the wash water in the reservoir during non-operation of the dishwasher, for production of sterilizing water.

23. The dishwasher according to claim 22, further comprising a water level detector disposed at one side of the reservoir, to detect a water level of the reservoir,
wherein the controller detects the water level of the reservoir, through the water level detector, and turns on the electrolyzer when the detected water level is equal to or more than a predetermined value.

24. The dishwasher according to claim 22, wherein, when the dishwasher operates, the controller turns on the electrolyzer, to cause the electrolyzer to electrolyze the wash water stored in the reservoir, for production of sterilizing water, and opens the flow path change valve, to supply the produced sterilizing water to be supplied to the water collector, for circular sterilization.

25. The dishwasher according to claim 24, wherein, when the dishwasher executes a preliminary wash operation, the controller turns on the electrolyzer, and opens the flow path change valve after a predetermined time elapses.

26. The dishwasher according to claim 24, wherein, after completion of a final rinsing operation executed when the dishwasher operates, the controller controls the circulator and the flow path change valve, to store water used in the final rinsing operation in the reservoir.

27. The dishwasher according to claim 26, wherein, after completion of the final rinsing operation, the controller opens the flow path change valve, detects the water level of the reservoir, and closes the flow path change valve when the detected water level is equal to or more than a predetermined value.

* * * * *